US010992921B1

(12) United States Patent
Cui

(10) Patent No.: US 10,992,921 B1
(45) Date of Patent: Apr. 27, 2021

(54) SELF-CALIBRATING STEREO CAMERA PAIRS PROVIDED ABOARD AERIAL VEHICLES

(71) Applicant: Amazon Technologies, Inc., Seattle, WA (US)

(72) Inventor: Chengwu Luke Cui, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 0 days.

(21) Appl. No.: 16/554,509

(22) Filed: Aug. 28, 2019

(51) Int. Cl.
*H04N 13/246* (2018.01)
*H04N 5/247* (2006.01)
*H04N 5/225* (2006.01)

(52) U.S. Cl.
CPC ......... *H04N 13/246* (2018.05); *H04N 5/2253* (2013.01); *H04N 5/247* (2013.01)

(58) Field of Classification Search
CPC ............ G06T 7/80; G06T 2207/10016; G06T 2207/30244; G06T 7/85; G06T 2207/10012; G06T 2207/30252; G06T 2207/10028; G06T 7/593; H04N 13/246; H04N 13/239; H04N 5/23238; H04N 2013/0081; G06K 9/00791; G06K 9/00798
See application file for complete search history.

(56) References Cited

U.S. PATENT DOCUMENTS

| | | |
|---|---|---|
| 2011/0216201 A1 | 9/2011 | McAndrew et al. |
| 2014/0140575 A1 | 5/2014 | Wolf |
| 2014/0249693 A1 | 9/2014 | Stark et al. |
| 2015/0186743 A1 | 7/2015 | Kamos |
| 2015/0227965 A1 | 8/2015 | Drysch et al. |
| 2016/0073101 A1 | 3/2016 | Keaffaber et al. |
| 2016/0313736 A1 | 10/2016 | Schultz et al. |
| 2016/0334276 A1 | 11/2016 | Pluvinage |
| 2017/0041557 A1 | 2/2017 | Urich et al. |
| 2017/0221226 A1* | 8/2017 | Shen .................... G06T 7/80 |
| 2018/0002017 A1 | 1/2018 | Abeles et al. |
| 2018/0046181 A1 | 2/2018 | Lai et al. |

* cited by examiner

*Primary Examiner* — Farhan Mahmud
(74) *Attorney, Agent, or Firm* — Athorus, PLLC

(57) ABSTRACT

An aerial vehicle is outfitted with two or more digital cameras that may be continuously calibrated. The aerial vehicle may include one or more markings provided on portions of a frame, a control surface or another component that are within fields of view of the digital cameras. Based on an initial calibration of the digital cameras, intrinsic and extrinsic parameters of the digital cameras may be determined. Using the intrinsic and extrinsic parameters, locations of the markings may be determined. Subsequently, after the aerial vehicle has engaged in flight operations, images captured of the marking may be used to determine whether the digital cameras remain properly calibrated, and whether images captured using the imaging devices may be relied upon in determining ranges to objects or for any other purpose. A correction factor may be generated based on any differences between projections of the markings within the respective images.

20 Claims, 20 Drawing Sheets

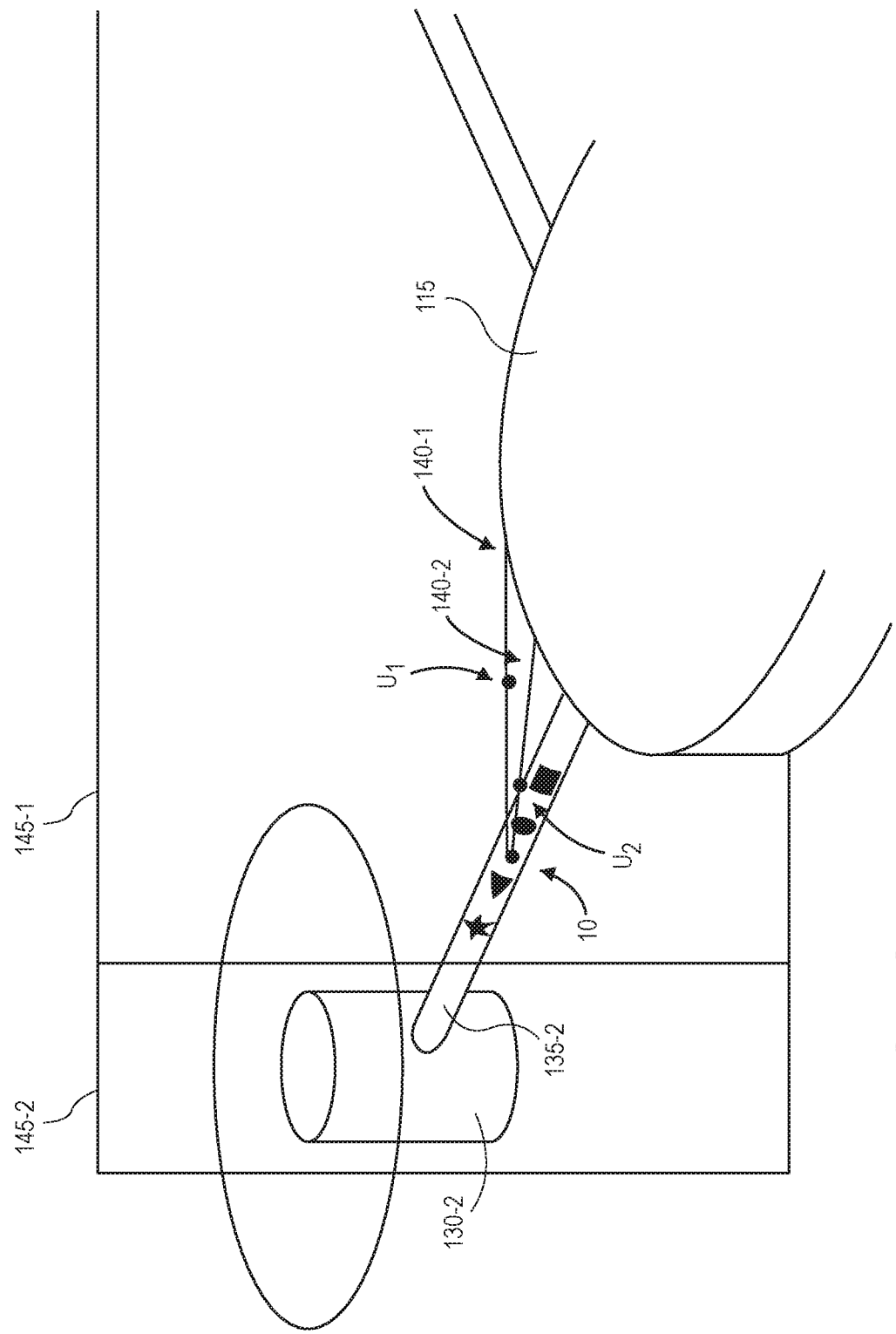

IMAGES CAPTURED BY CAMERAS FOLLOWING INITIAL CALIBRATION

DEPTH MAP GENERATED FROM IMAGES

IMAGES CAPTURED BY CAMERAS DURING OPERATION

INTRINSIC AND/OR EXTRINSIC PARAMETERS MODIFIED TO ACCOUNT FOR DIFFERENCES IN PROJECTIONS

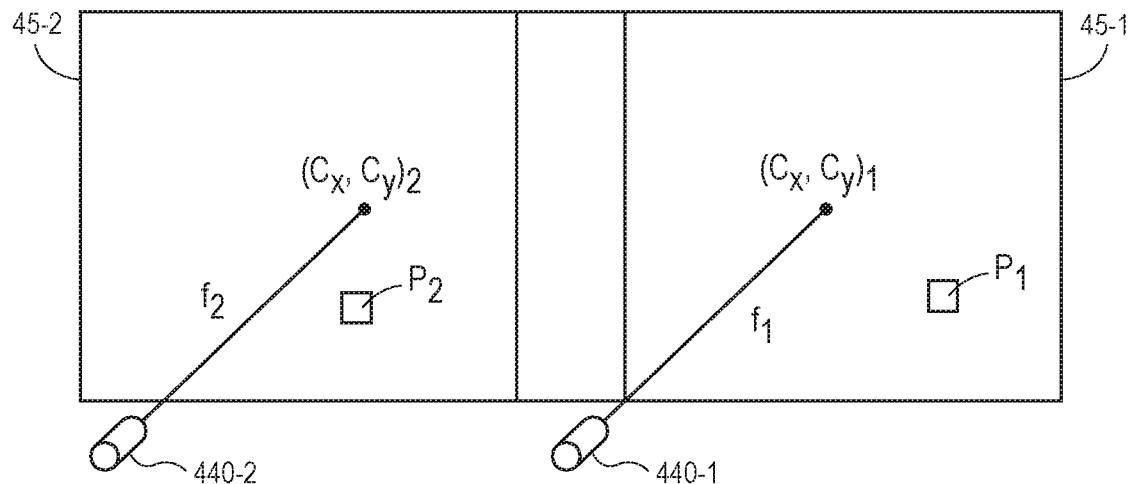
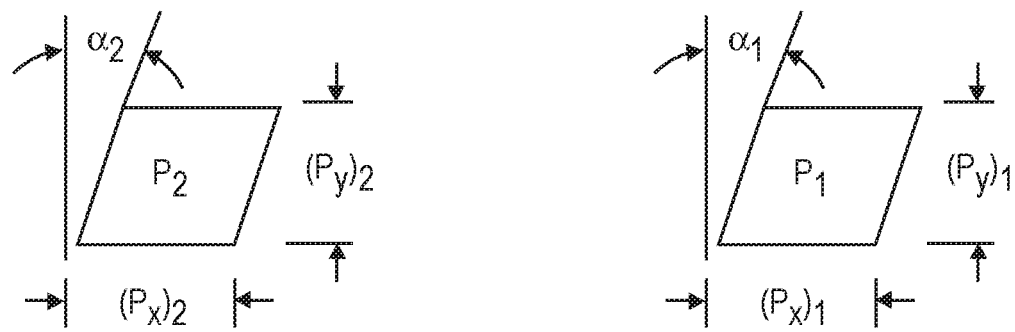
FIG. 4E

IMAGES CAPTURED FOLLOWING CALIBRATION AT TIME $t_1$

IMAGES SUBSEQUENTLY CAPTURED DURING OPERATIONS AT TIME $t_2$

SELF-CALIBRATING STEREO CAMERA PAIRS PROVIDED ABOARD AERIAL VEHICLES

BACKGROUND

Aerial vehicles are frequently equipped with one or more imaging devices such as digital cameras which may be used to aid in the guided or autonomous operation of an aerial vehicle, to determine when the aerial vehicle has arrived at or passed over a given location, or is within range of one or more structures, features, objects or humans (or other animals), to conduct monitoring operations, or for any other purpose. Aerial vehicles may be outfitted with imaging devices in any manner, e.g., by embedding or mounting imaging devices to one or more external surfaces of frames, motors, propellers, control surfaces, appurtenances or extensions, or other features.

Stereo ranging (or stereo triangulation) is a process by which distances or ranges to objects may be determined from digital images that are captured using imaging devices, such as digital cameras, that are separated by a fixed distance. For example, by processing pairs of images of an environment that are captured by imaging devices, ranges to points expressed in both of the images (including but not limited to points associated with specific objects) may be determined by finding a virtual intersection of pairs of lines extending from the respective lenses or sensors of the imaging devices through representations of such points within each of the images. If each of the images is captured substantially simultaneously, or if conditions of the environment are substantially unchanged when each of the images is captured, a range to a single point within the environment at a given time may be determined based on a baseline distance between the lenses or sensors of the imaging devices that captured such images and a disparity, or a distance between corresponding representations of a single point in space expressed within both of the images when the images are superimposed upon one another. Such processes may be completed for any number of points in three-dimensional space that are expressed in both of the images, and a model of such points, e.g., a point cloud, a depth map or a depth model, may be defined accordingly. The model of such points may be updated as pairs of images are subsequently captured and processed to determine ranges to such points.

In order for cameras to be operated in pairs for stereo ranging, the cameras must be calibrated. During calibration, intrinsic parameters such as those that are internal and associated with the camera in a particular configuration and allow the camera to be mapped between camera coordinates and pixel coordinates within an image frame, may be determined. Likewise, extrinsic parameters, or parameters that are external to the camera and define the camera's location and orientation with respect to the real world, may also be determined.

As with other imaging systems, stereo ranging systems necessarily depend on digital cameras or other imaging devices that are properly calibrated in order to operate effectively. During flight operations, aerial vehicle frames are typically subjected to shocks from contact with other objects, such as debris, landing surfaces, or other vehicles, as well as adverse environmental conditions (e.g., airflow, wind, weather or the like), vibrations due to operations, or the like, which may cause temporary or permanent changes in the alignment, orientation or condition of imaging devices mounted thereto or embedded therein. Because imaging devices of stereo ranging systems must be rigidly aligned in pairs, changes in the alignment, orientation or condition of the digital cameras may lead to severe image quality degradation. For example, where the imaging devices of a pair are not aligned in parallel and vibrating synchronously, depths or ranges determined from the imaging devices are ineffective or useless.

BRIEF DESCRIPTION OF THE DRAWINGS

FIGS. 1A through 1L are views of aspects of one system including a self-calibrating stereo camera pair in accordance with embodiments of the present disclosure.

FIGS. 4A through 4I are views of aspects of one system including a self-calibrating stereo camera pair in accordance with embodiments of the present disclosure.

DETAILED DESCRIPTION

As is set forth in greater detail below, the present disclosure is directed to pairs of digital cameras (e.g., black-and-white, grayscale or color cameras) or other imaging devices that are mounted to aerial vehicles and configured to include fiducials or other markings that are provided on surfaces or structures of aerial vehicles within their respective fields of view. More specifically, the systems and methods disclosed herein are directed to providing fiducials or other markings (e.g., one or more lines, shapes, patterns, colors, textures, trademarks, alphanumeric characters or symbols) on surfaces of an aerial vehicle having two or more digital cameras that are configured for use in stereo ranging operations, such that the markings remain within the fields of view of the digital cameras. The fiducials or other markings may have unique or discernable levels of contrast, as compared to surfaces of the aerial vehicle upon which such markings are located, such that the markings may be readily detected within images, e.g., by one or more recognition or detection algorithms.

In an initial calibration, intrinsic parameters such as focal lengths and optical centers (or optical axes, or axes of orientation) of the digital cameras, and extrinsic parameters such as the positions and rotations (e.g., yaw angles, pitch angles and roll angles) of the digital cameras, as well as any other factors regarding the digital cameras, including but not limited to measures of skew or distortion, may be determined. From the intrinsic parameters and the extrinsic cameras, projections of the fiducials or other markings within the image planes of the digital cameras may be determined.

Subsequently, during or following operations of the aerial vehicle, which may result in shocks, vibrations or displacement of the digital cameras, or subject to the digital cameras to adverse environmental conditions, projections of the fiducials or other markings within the fields of view of the digital cameras may be determined and compared to the projections determined following an initial calibration, or a prior calibration. If the projections of the fiducials or other markings determined both following an initial or prior calibration and also following the operations of the aerial vehicle are inconsistent with one another, due to events that occurred during the operations or any other considerations, a correction matrix or other factor may be generated to account for such deviations and stored in association with the respective images. Subsequently, the correction matrices or factors may be used to recalibrate the digital cameras, or to compensate or adjust depth data generated from pairs of the images for such deviations.

Figure 1A:
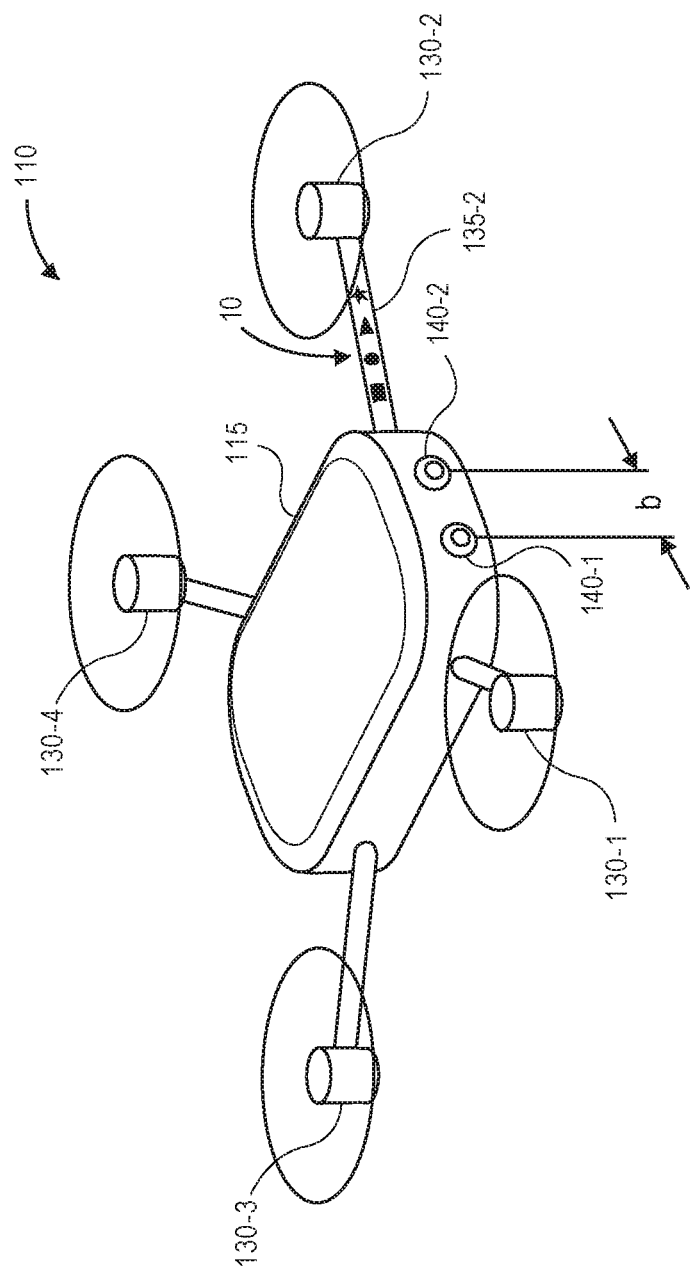

Referring to FIGS. 1A through 1L, views of aspects of one system including a self-calibrating stereo camera pair in accordance with embodiments of the present disclosure are shown. As is shown in FIG. 1A, an aerial vehicle 110 includes a frame 115, a plurality of propulsion motors 130-1, 130-2, 130-3, 130-4 and a pair of digital cameras 140-1, 140-2. Each of the propulsion motors 130-1, 130-2, 130-3, 130-4 is mounted to the frame 115 and rotatably coupled with a propeller by way of a mast or a shaft of a transmission. Each of the propulsion motors 130-1, 130-2, 130-3, 130-4 is configured to rotate the propeller about the mast or shaft, at a desired angular velocity, to provide forces of lift or thrust to the aerial vehicle 110.

The digital cameras 140-1, 140-2 are mounted within a forward end or face of the frame 115, with the digital camera 140-1 provided on a starboard side of the frame 115, and the digital camera 140-2 provided on a port side of the frame 115, separated by a baseline distance b. The digital cameras 140-1, 140-2 may be configured to capture color or grayscale images or other imaging data of background or foreground features in an environment in which the aerial vehicle 110 operates (e.g., structures, vehicles or other machines, plant or animal life), or airborne elements that may approach or be located near the aerial vehicle 110 (e.g., birds, other aerial vehicles, or any other airborne objects). The digital cameras 140-1, 140-2 may be configured to capture pairs of images simultaneously, or nearly simultaneously, as the aerial vehicle 110 is engaged in flight operations.

Figure 1B:
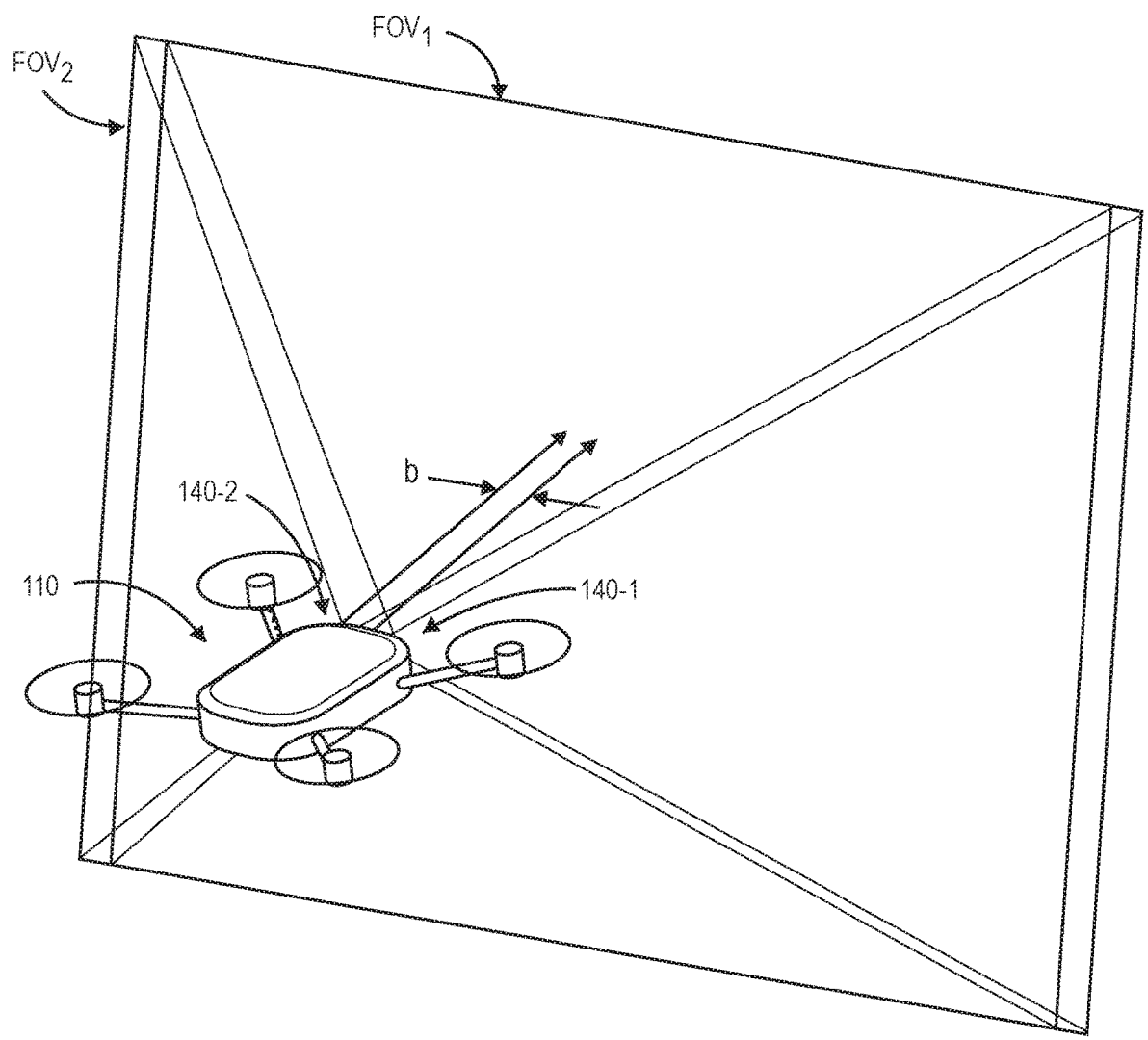

As is shown in FIG. 1A, each of the digital cameras 140-1, 140-2 is aligned with a field of view that is oriented in a substantially forward direction with respect to the frame 115. The fields of view of the respective cameras 140-1, 140-2 overlap at least in part forward of the aerial vehicle 110. Alternatively, in some embodiments, the digital cameras 140-1, 140-2 may be aligned with fields of view that are oriented in a substantially downward direction with respect to the frame 115, or in any other direction with respect to the frame 115. As is shown in FIG. 1B, optical axes of the digital cameras 140-1, 140-2 are separated by the baseline distance b, and fields of view $FOV_1$, $FOV_2$ of the respective digital cameras 140-1, 140-2 extend forward of the aerial vehicle 110 in a diverging manner.

Additionally, as is shown in FIGS. 1A and 1C, a strut 135-2 coupling the propulsion motor 130-2 to the frame 115 includes a series of markings 10, viz., a square, a circle, a triangle and a star aligned in series, between the frame 115 and the propulsion motor 130-2. The markings 10 are provided on a surface of the strut 135-2 that remains within the fields of view $FOV_1$, $FOV_2$ of both of the digital cameras 140-1, 140-2. Alternatively, or additionally, the markings 10 may include any number of lines, shapes, patterns, colors, textures, trademarks, alphanumeric characters, symbols or any other markings. Thus, as is shown in FIG. 1C, because the markings 10 are fixed in their position with respect to the digital cameras 140-1, 140-2, the markings 10 each have fixed projections $U_1$, $U_2$ within the image planes 145-1, 145-2 of the digital cameras 140-1, 140-2, when the digital cameras 140-1, 140-2 are properly calibrated.

As is discussed above, and in accordance with the present disclosure, the aerial vehicle 110 may be configured to capture images using a pair of digital cameras 140-1, 140-2 that are calibrated with respect to one another and include the markings 10 within their respective fields of view. The images captured by the digital cameras 140-1, 140-2 may be used for any purpose, such as to determine ranges or distances to one or more objects appearing within the fields of view, e.g., to generate a depth map. Parameters of the digital cameras 140-1, 140-2, such as focal lengths, optical centers (or optical axes), rotational vectors (e.g., yaw angles, pitch angles or roll angles) and translation vectors, measures of skew or distortion, or any other parameters, may be determined and used to generate a camera matrix or other tool for mapping points in three-dimensional space to pixels within a two-dimensional image plane.

Subsequently, as the markings 10 are detected within images captured by the digital cameras 140-1, 140-2, projections of the markings 10 within the images may be identified and used to recalibrate the digital cameras 140-1, 140-2, as necessary, e.g., by generating a new camera matrix for one or both of the cameras, or to generate a correction matrix for compensating depth data generated from the images, such as where the projections are different from the projections of the markings 10 following the calibration of the digital cameras 140-1, 140-2, e.g., the projections $U_1$, $U_2$.

Figure 1D:
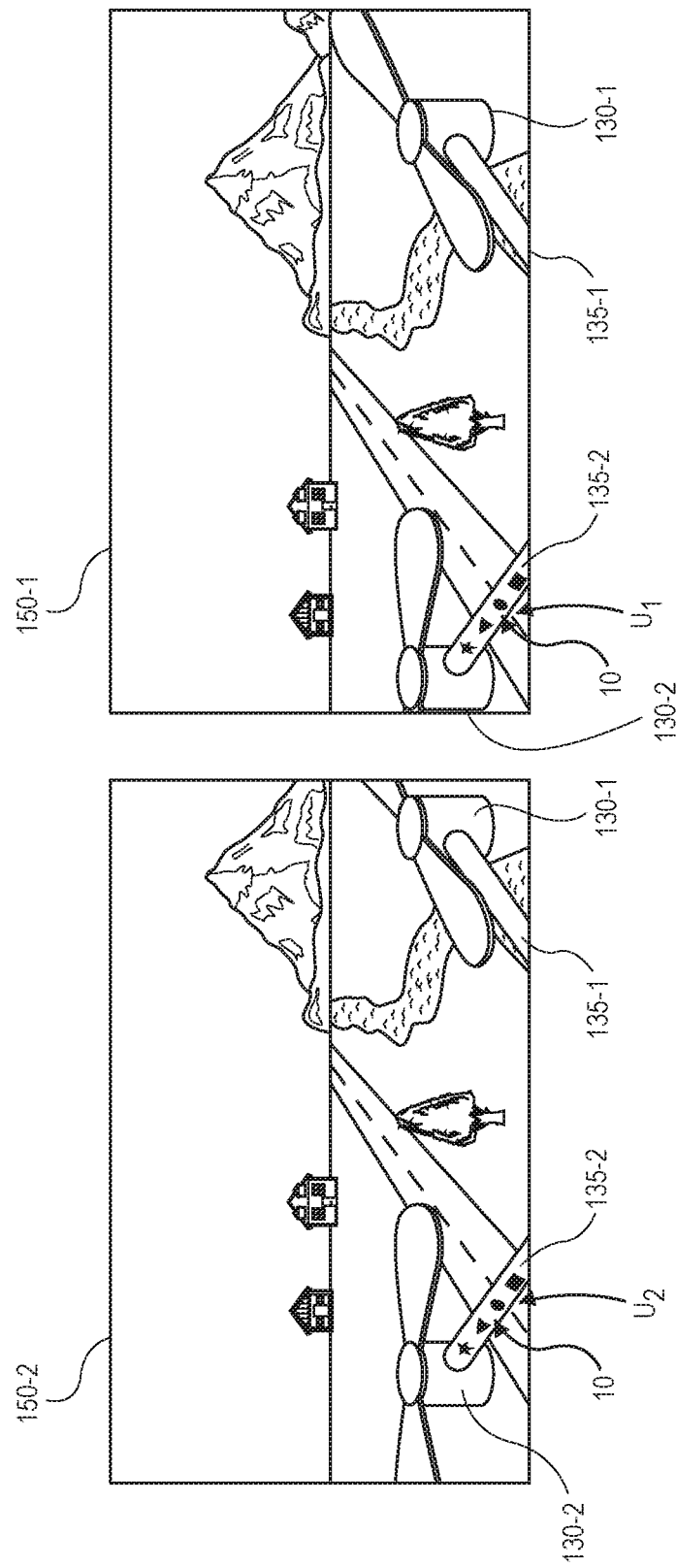

As is shown in FIG. 1D, a pair of images 150-1, 150-2 captured using the digital cameras 140-1, 140-2 shortly after the digital cameras 140-1, 140-2 were calibrated, e.g., either initially or at a later time, are shown. The pair of images 150-1, 150-2 depict foreground features, such as the portions of the aerial vehicle 110, that are present within the fields of view of the digital cameras 140-1, 140-2. The images 150-1, 150-2 also depict background features such as terrain, structures, vehicles or other machines, or plant or animal life. For example, as is shown in FIG. 1D, each of the images 150-1, 150-2 depicts the propulsion motors 130-1, 130-2, as well as the strut 135-2 for the propulsion motor 130-2 having the markings 10 thereon, within limited portions of the images 150-1, 150-2, e.g., in bottom-left and bottom-right corners of each of the images 150-1, 150-2.

The pair of images 150-1, 150-2 captured using the digital cameras 140-1, 140-2 may be utilized for any purpose, including but not limited to generating depth data regarding an environment in which the aerial vehicle 110 travels. The images 150-1, 150-2 may be provided to a computer device residing aboard the aerial vehicle 110 (e.g., within the frame 115) or in one or more external locations, including but not limited to a ground-based or a "cloud"-based facility having one or more servers or other computer devices, or to a facility residing aboard one or more other aerial vehicles (not shown) or in any other location. In some embodiments, features of the images 150-1, 150-2 captured by the digital cameras 140-1, 140-2 may be mapped or fused (e.g., overlapped) together, in order to determine which points expressed in the image 150-1 correspond to points expressed in the image 150-2, or vice versa. Distances to points corresponding to such features may be determined according to stereo ranging algorithms or techniques and stored in one or more data stores or used for any purpose, including but not limited to navigation, guidance, monitoring or collision avoidance.

Figure 1E:
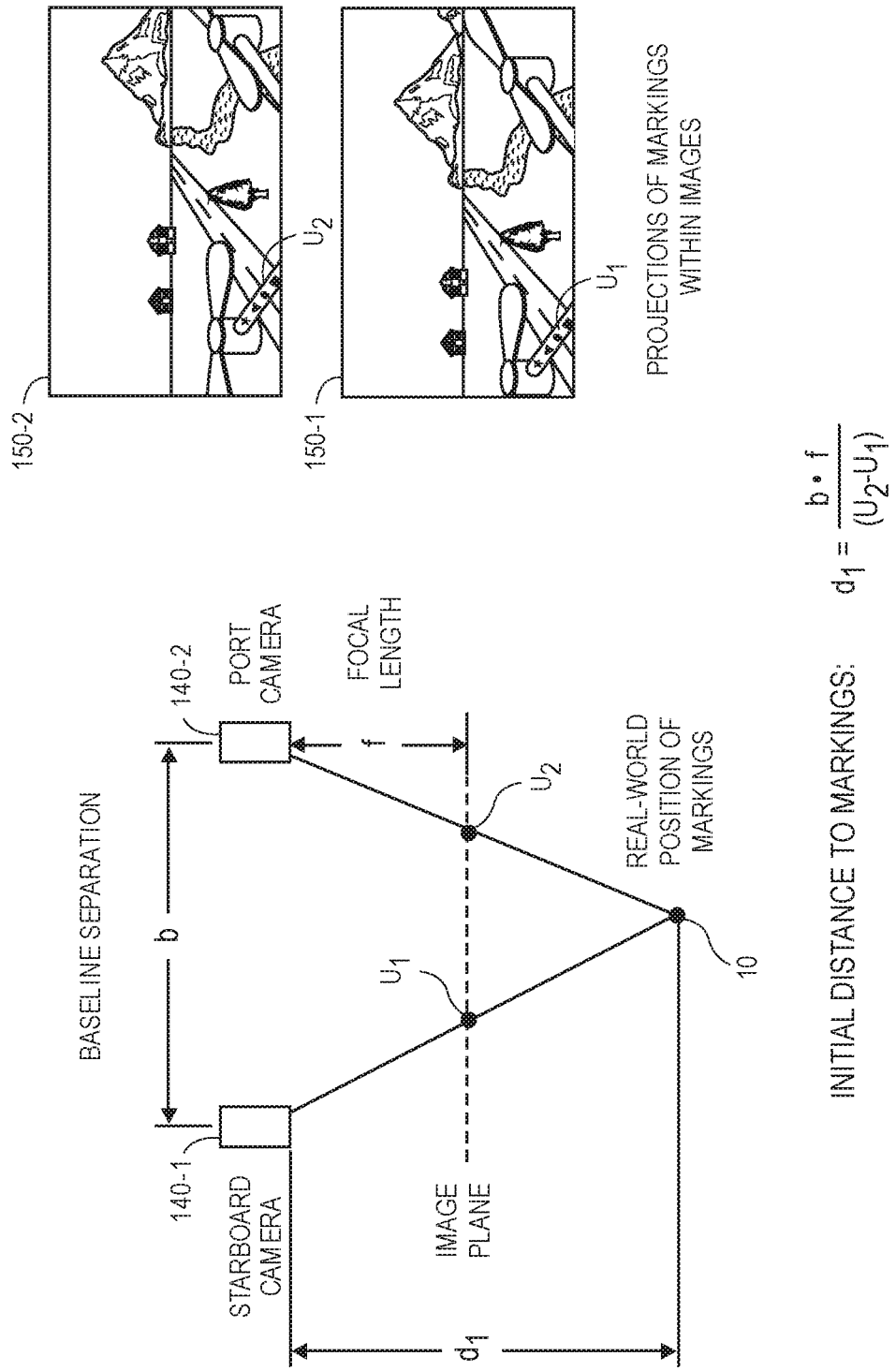

The images 150-1, 150-2 may be processed to determine ranges to points appearing within each of the images according to one or more stereo ranging algorithms or techniques. As is shown in FIG. 1E, a distance $d_1$ to a real-world position of the markings 10 at a time that the images 150-1, 150-2 were captured may be determined based on focal lengths f of the digital cameras 140-1, 140-2 and the projections $U_1$, $U_2$ of the markings 10 within the respective images 150-1, 150-2. For example, one or more algorithms or techniques may automatically determine the position of the markings 10 in space by triangulating the positions of the digital cameras 140-1, 140-2 with respect to the projections $U_1$, $U_2$ using the focal length f and the baseline distance (or baseline separation) b. The distance $d_1$ to the real-world position of the markings 10 may be calculated as a product of the baseline distance b and the focal length f, divided by a disparity $U_2-U_1$ between the projections $U_1$, $U_2$ within the images 150-1, 150-2. In some embodiments, the digital cameras 140-1, 140-2 may have the same focal length f when the images 150-1, 150-2 are captured. In other embodiments, the digital cameras 140-1, 140-2 may have different focal lengths when the images 150-1, 150-2 are captured, and a calculation for determining the distance $d_1$ to the markings 10 may be modified to account for differences in focal lengths of the digital cameras 140-1, 140-2.

Figure 1F:
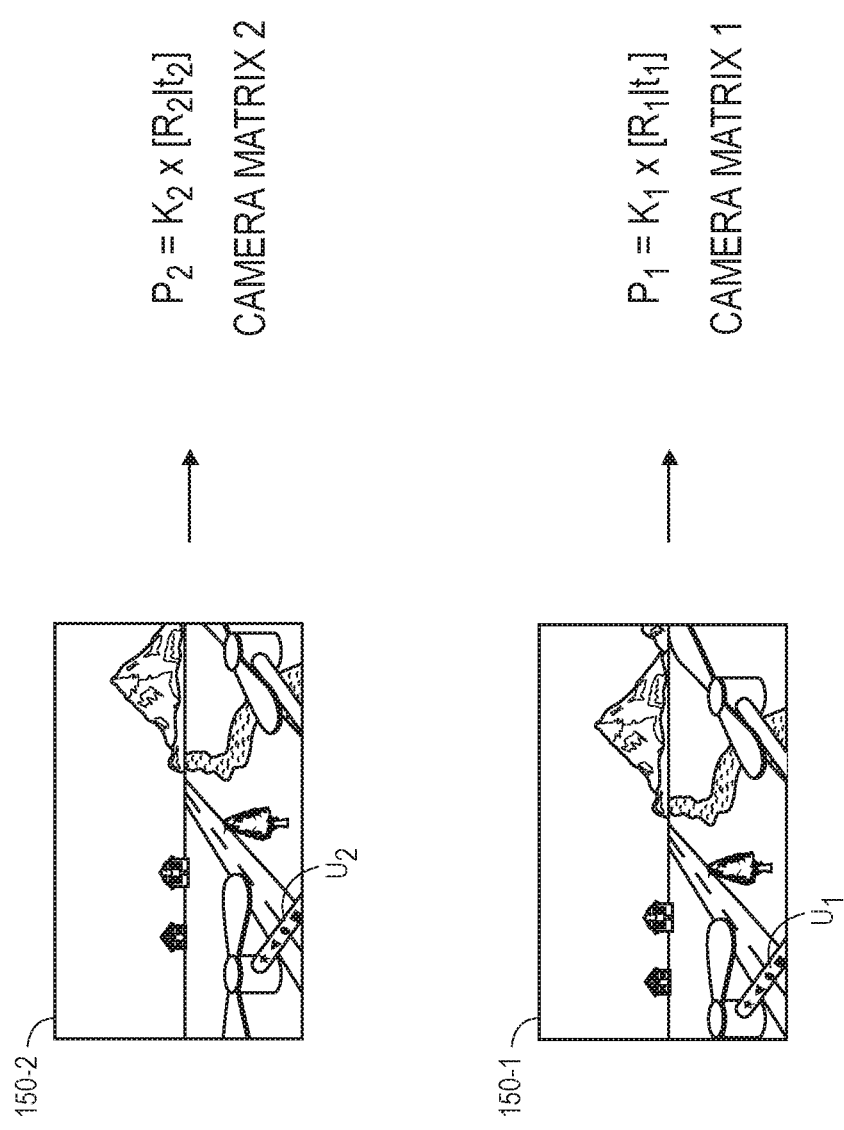

As is shown in FIG. 1F, based on the initial calibration of the digital cameras 140-1, 140-2, intrinsic and extrinsic parameters of the digital cameras 140-1, 140-2 may be determined and used to construct camera matrices $P_1$, $P_2$ for the digital cameras 140-1, 140-2. A camera matrix is a mapping between real-world objects in three-dimensional space and projections of those objects in an image plane in two-dimensional space. The camera matrices $P_1$, $P_2$ for the digital cameras 140-1, 140-2 thus relate matrices of their intrinsic parameters $K_1$, $K_2$ of the digital cameras 140-1, 140-2, viz., focal lengths, optical centers (or optical axes), and measures of skew or distortion, with matrices of their extrinsic parameters $[R_1|t_1]$, $[R_2|t_2]$, viz., their respective rotations and translations.

Figure 1G:
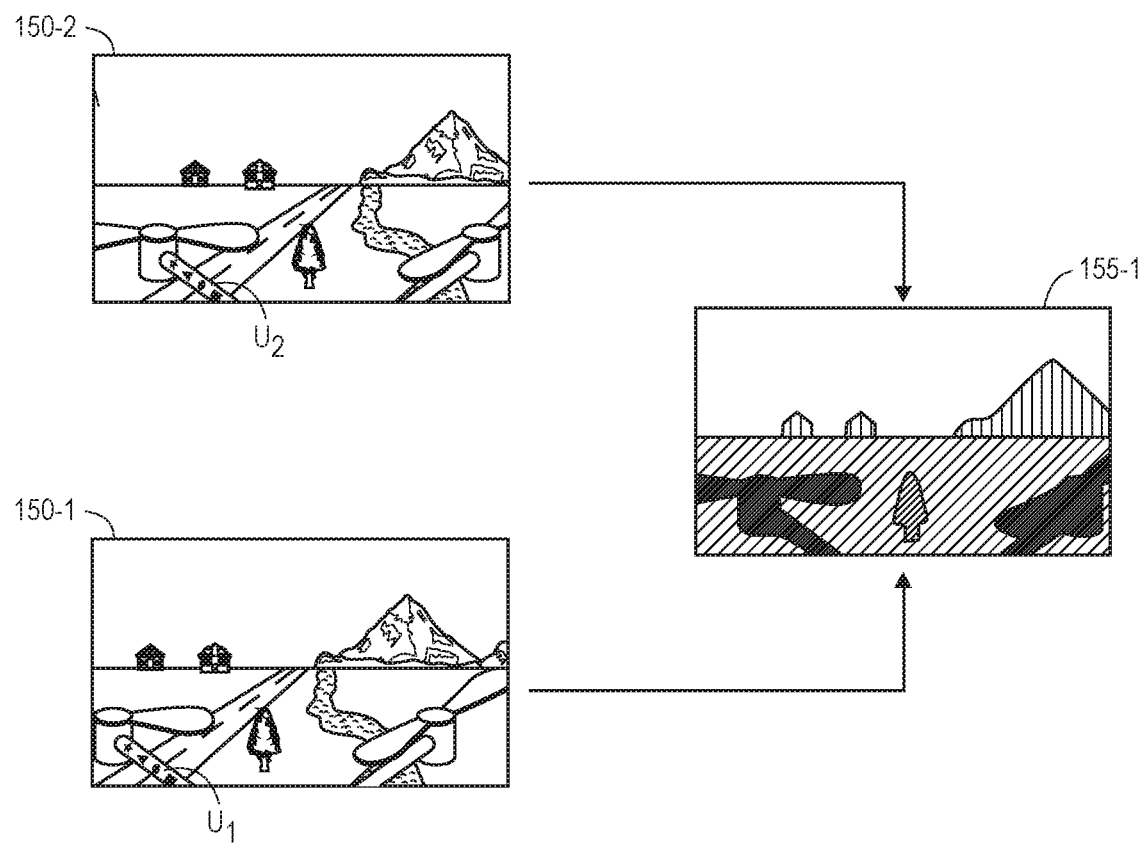

Additionally, as is shown in FIG. 1G, the images 150-1, 150-2 may be further processed to generate a depth map 155-1, which may be a two-dimensional representation of ranges from the aerial vehicle 110 to a plurality of points appearing within both of the images 150-1, 150-2, determined as a function of the baseline distance b and the focal length f, divided by disparities between the respective points within the images 150-1, 150-2.

Subsequently, after calibrating the digital cameras 140-1, 140-2, and determining the camera matrices $P_1$, $P_2$ of the mappings between real-world objects and projections of such objects within the image planes of the digital cameras 140-1, 140-2, the aerial vehicle 110 may conduct any number of operations. As is shown in FIG. 1H, the aerial vehicle 110 may take off at a location 170-1 and engage in horizontal flight operations, vertical flight operations and/or hovering operations prior to landing at a location 170-2, and taking off again from the location 170-2 to travel via horizontal flight operations, vertical flight operations and/or hovering operations in traveling to a location 170-3.

Figure 1H:
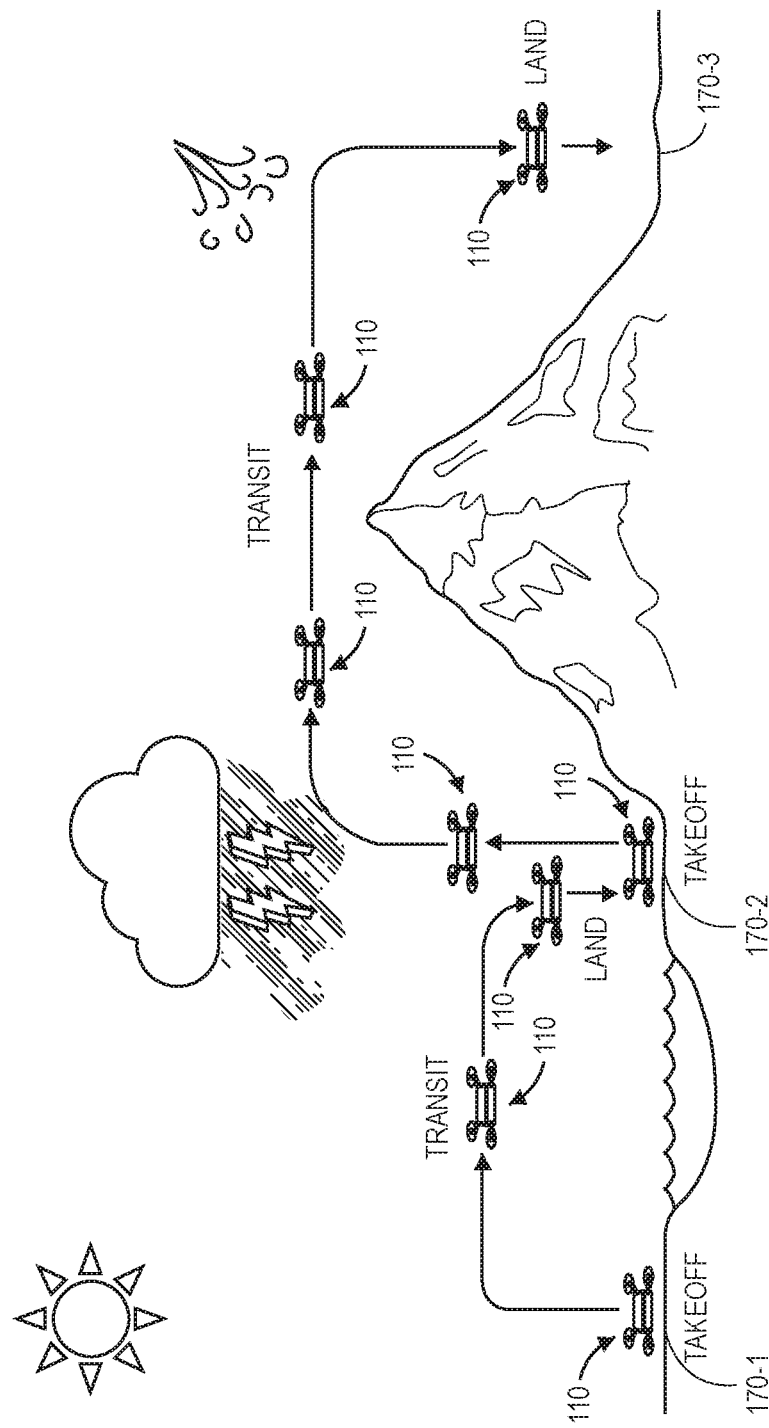
Figure 11:
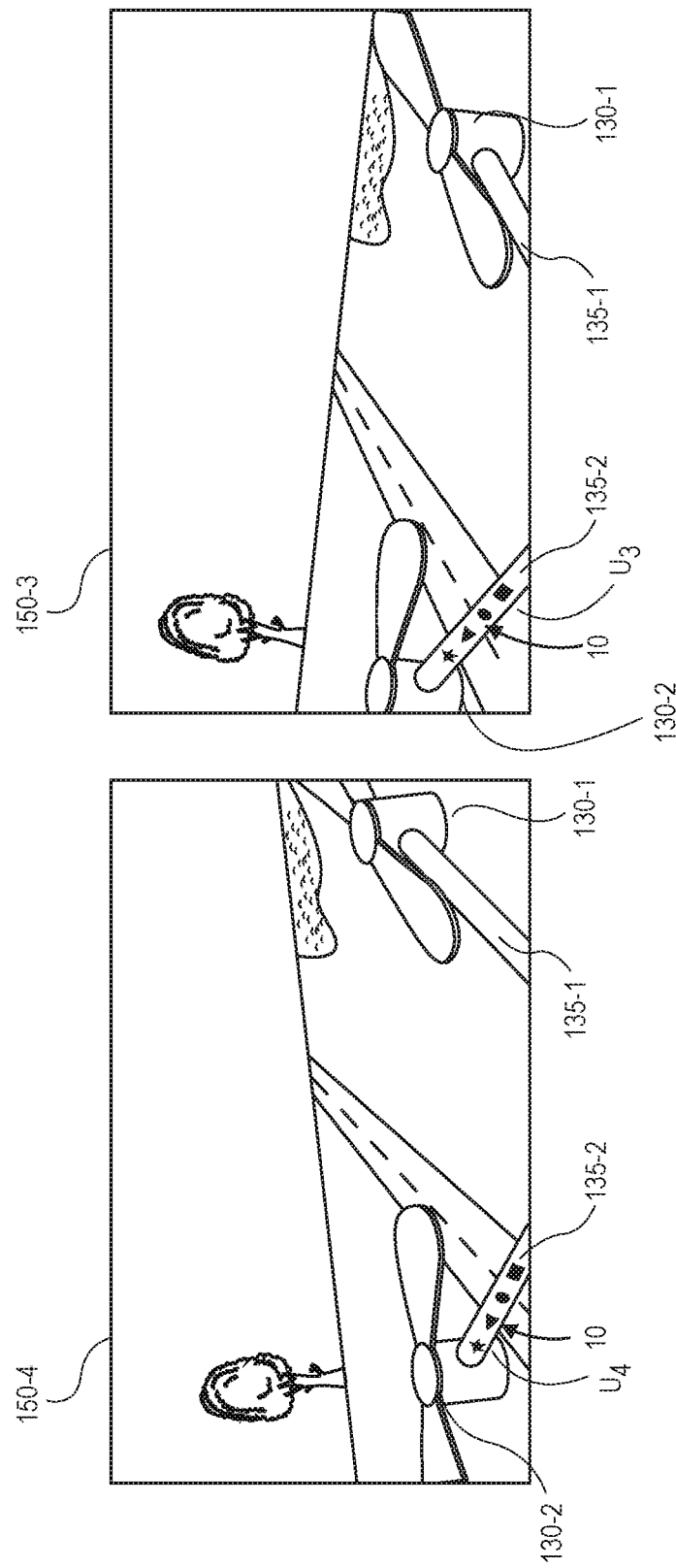

During flight operations, such as those shown in FIG. 1H, or when the aerial vehicle 110 is at rest, the aerial vehicle 110 may be subjected to shocks, environmental conditions, vibrations or other adverse effects that may cause temporary or permanent changes in the alignment, orientation or condition of digital cameras 140-1, 140-2 mounted thereto or embedded therein. In particular, such effects may result in changes to one or more of the intrinsic parameters or the extrinsic parameters of either or both of the digital cameras 140-1, 140-2, including but not limited to one or more of the focal lengths, optical centers, or aspects of their respective rotations or translations. In accordance with embodiments of the present disclosure, however, the digital cameras 140-1, 140-2 may be calibrated or recalibrated from time to time, e.g., periodically or intermittently, such as after a predetermined period of time has lapsed since a prior calibration, after the aerial vehicle 110 has traveled at least a predetermined distance or operated for at least a predetermined time, or after any number of images have been captured by one or both of the digital cameras 140-1, 140-2.

As is shown in FIG. 1I, a pair of images 150-3, 150-4 captured using the digital cameras 140-1, 140-2 at a later time, e.g., after the images 150-1, 150-2 were captured, or after the aerial vehicle 110 has completed one or more of the operations shown in FIG. 1H is shown. Each of the pair of images 150-3, 150-4 also depicts foreground features and background features, including but not limited to portions of the propulsion motors 130-1, 130-2 and the strut 135-2, within limited portions of the images 150-3, 150-4, e.g., in bottom-left and bottom-right corners of each of the images 150-3, 150-4.

Figure 1J:
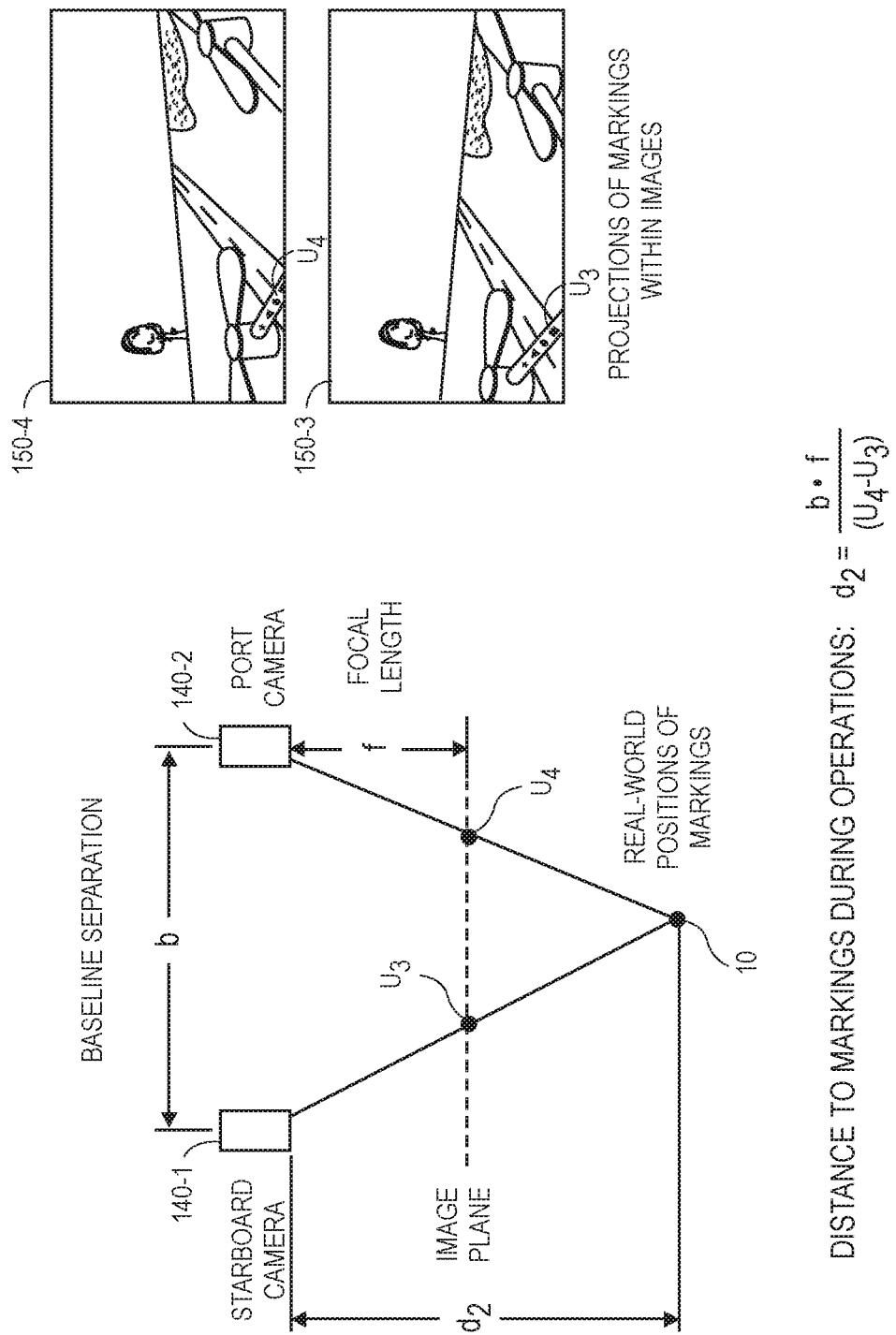

Whether one or more of the intrinsic parameters or the extrinsic parameters of either of the digital cameras 140-1, 140-2 has changed during operations of the aerial vehicle 110 may be determined in any manner and on any basis, such as upon determining an error or deviation in images captured by one or both of the digital cameras 140-1, 140-2. As is shown in FIG. 1J, the pair of images 150-3, 150-4 may also be utilized for any purpose, including but not limited to generating depth data. For example, a distance $d_2$ to the real-world position of the markings 10 may be determined from the images 150-3, 150-4 based on focal lengths f of the digital cameras 140-1, 140-2 and projections $U_3$, $U_4$ of the markings 10 within the respective images 150-3, 150-4. For example, one or more stereo ranging algorithms and techniques may automatically determine the position of the markings 10 in space by triangulating the positions of the digital cameras 140-1, 140-2 with respect to the projections $U_3$, $U_4$ using the focal length f and the baseline distance b. The distance $d_2$ to the real-world position of the markings 10 is calculated as a product of the baseline distance b and the focal length f, divided by a disparity $U_4-U_3$ between the projections $U_3$, $U_4$ within the images 150-3, 150-4.

Where the projections $U_3$, $U_4$ of the markings within the images 150-3, 150-4 are consistent with one another, the distance $d_2$ to the markings 10 will equal the distance $d_1$, and the camera matrices $P_1$, $P_2$ of the digital cameras 140-1, 140-2 may be understood to remain unchanged. To the extent that the projection $U_4$ of the markings 10 within the image 150-4 differs from the projection $U_2$ of the markings 10 within the image 150-2, or the projection $U_3$ of the markings 10 within the image 150-3 differs from the projection $U_1$ of the markings 10 within the image 150-1, one or more factors or parameters for correcting or for accounting for differences in the projections of the markings 10 may be generated. Alternatively, or additionally, deviations between the projections $U_4$, $U_2$ or the projections $U_3$, $U_1$ may indicate that one or both of the digital cameras 140-1, 140-2 may require maintenance or adjustment.

Figure 1K:
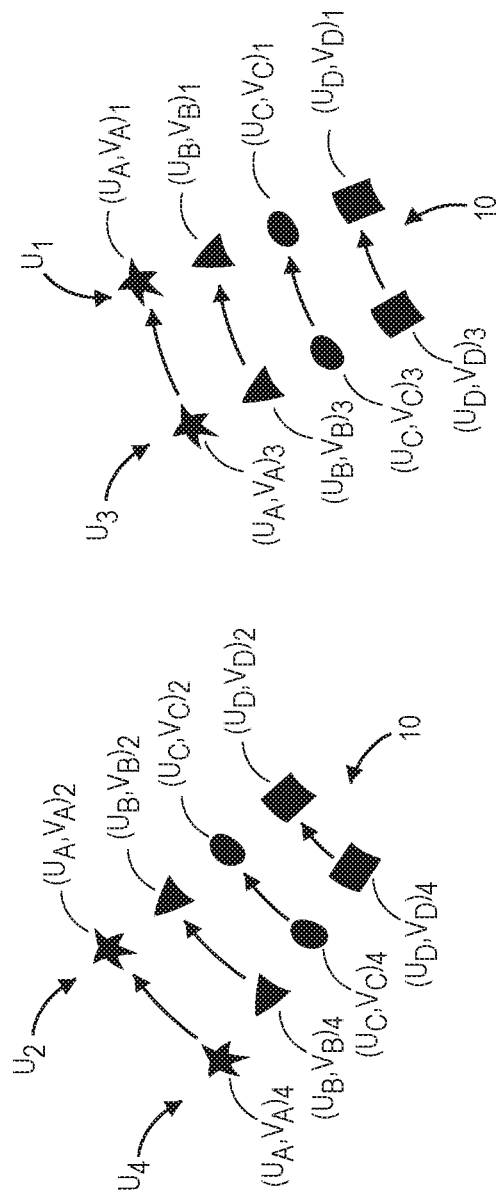

As is shown in FIG. 1K, one or more of the intrinsic parameters or the extrinsic parameters of the digital cameras 140-1, 140-2 may be modified to account for the differences in the projections $U_3$, $U_4$ of the markings 10. For example, with regard to the digital camera 140-1, where any of the positions $(u_A, v_A)_1$, $(u_B, v_B)_1$, $(u_C, v_C)_1$, $(u_D, v_D)_1$ of the markings 10 that define the projection $U_1$ within the image 150-1 are different from any of the positions $(u_A, v_A)_3$, $(u_B, v_B)_3$, $(u_C, v_C)_3$, $(u_D, v_D)_3$ of the markings 10 that define the projection $U_3$ within the image 150-3, one or more of the intrinsic parameters or the extrinsic parameters of the digital camera 140-1 may be modified accordingly. Likewise, where any of the positions $(u_A, v_A)_2$, $(u_B, v_B)_2$, $(u_C, v_C)_2$, $(u_D, v_D)_2$ of the markings 10 that define the projection $U_2$ within the image 150-2 are different from any of the positions $(u_A, v_A)_4$, $(u_B, v_B)_4$, $(u_C, v_C)_4$, $(u_D, v_D)_4$ of the markings 10 that define the projection $U_4$ within the image 150-4, one or more of the intrinsic parameters or the extrinsic parameters of the digital camera 140-2 may be modified accordingly. The modified intrinsic parameters or extrinsic parameters, or a matrix or set of such parameters, may be stored in association with each of the images 150-3, 150-4.

Figure 1L:
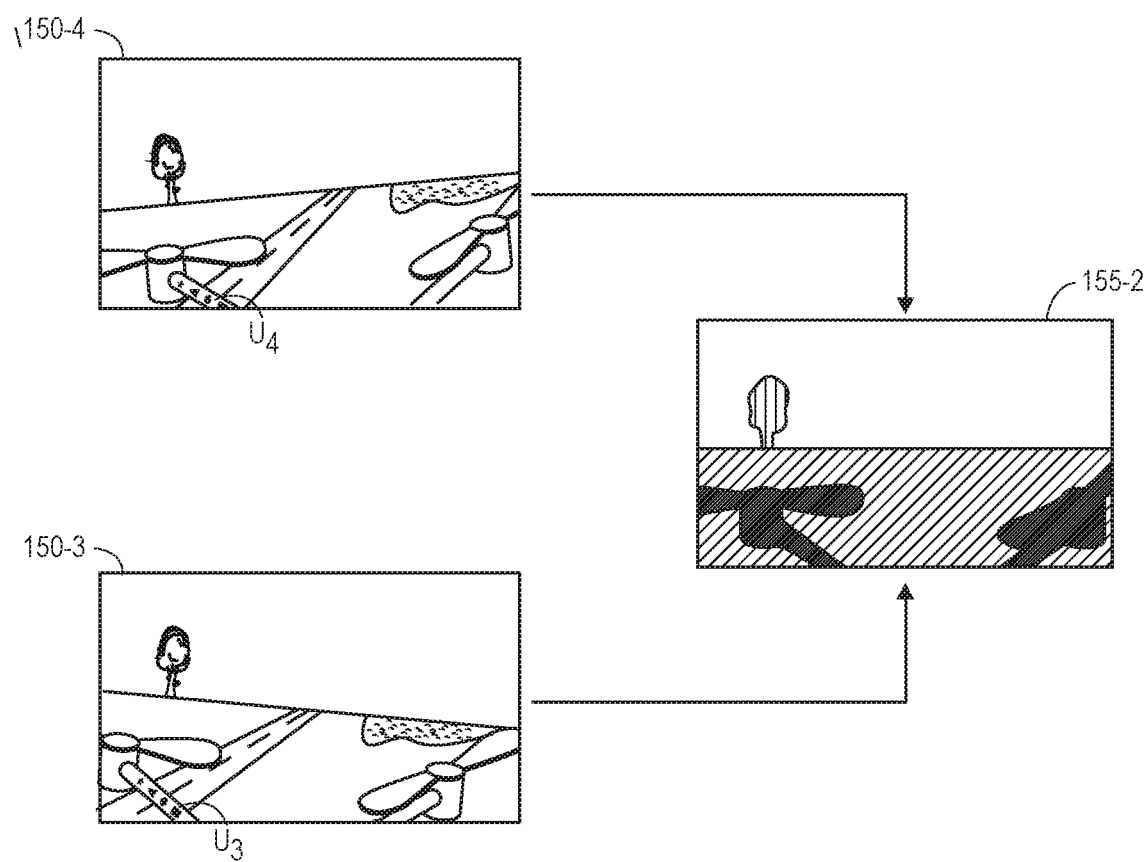

Subsequently, after one or more of the intrinsic parameters or the extrinsic parameters has been modified, the images 150-3, 150-4 may be utilized for any purpose. For example, as is shown in FIG. 1L, the images 150-3, 150-4 may be processed to generate a depth map 155-2, which may be a two-dimensional representation of ranges from the aerial vehicle 110 to a plurality of points appearing within both of the images 150-3, 150-4.

Accordingly, the systems and methods of the present disclosure may be used to calibrate pairs of imaging devices (e.g., digital cameras) using fiducials or other markings provided on surfaces of the aerial vehicles that remain within fields of view of the imaging devices during operations. Parameters of the digital cameras (e.g., intrinsic parameters or extrinsic parameters) may be determined following an initial calibration of the digital cameras, and projections of the fiducials or other markings within the fields of view of the digital cameras may be determined. After the aerial vehicle has engaged in flight operations, the calibration of the digital cameras may be confirmed by detecting the fiducials or other markings within images captured by the digital cameras. If the projections of the fiducials or other markings within such images are consistent with the projections of the fiducials or other markings determined following an initial calibration, a set of one or more correction parameters may be calculated and applied to the images, such that the images may be used in generating depth data (e.g., stereo ranging) operations, or the digital cameras may be subject to one or more maintenance operations accordingly.

The imaging devices of the present disclosure may be mounted, fixed, embedded or otherwise joined to one or more external surfaces of an aerial vehicle in any manner and in any orientation or alignment. For example, imaging devices may be joined to a forward end of an aerial vehicle, such as is shown in FIGS. 1A and 1B. Alternatively, imaging devices may be mounted to a port side, a starboard side, an aft end of the aerial vehicle, to an upper surface or lower surface of the aerial vehicle, or to any other external surfaces of frames, motors, propellers, control surfaces, appurtenances or extensions, or other features of an aerial vehicle. Additionally, imaging devices may be aligned to capture still or moving images from fields of view that extend in any direction, e.g., from fields of view that extend forward of the aerial vehicle, in lateral (e.g., port or starboard) directions, aft of the aerial vehicle, or above or below the aerial vehicle. The imaging devices may also be equipped with one or more systems for varying their axes of alignment and/or directions of their respective fields of view.

In accordance with the present disclosure, images captured by imaging devices may be used to determine stereo distance information according to any number of stereo ranging algorithms or techniques. Outputs from such algorithms or techniques may be generated or stored in any form, and used for any purpose. For example, in some embodiments, distances to objects or features in an environment determined according to stereo ranging algorithms or techniques may be aggregated into a depth map that identifies or represents nominal or average distances to such objects or features and tolerances associated with such distances. In some other embodiments, a point cloud or other three-dimensional representation of an environment may be generated and stored in one or more data files. The point cloud may represent positions of each of the points that appear in both of the images of a pair, with pixel-level resolution.

Imaging data (e.g., visual imaging data) may be captured using one or more imaging devices such as digital cameras. Such devices may generally operate by capturing light that is reflected from objects, and by subsequently calculating or assigning one or more quantitative values to aspects of the reflected light, e.g., pixels, generating an output based on such values, and storing such values in one or more data stores. Digital cameras may include one or more sensors having one or more filters associated therewith, and such sensors may detect information regarding aspects of any number of pixels of the reflected light corresponding to one or more base colors (e.g., red, green or blue) of the reflected light. Such sensors may generate data files including such information, e.g., digital images, and store such data files in one or more onboard or accessible data stores (e.g., a hard drive or other like component), as well as one or more removable data stores (e.g., flash memory devices), or displayed on one or more broadcast or closed-circuit television networks, or over a computer network as the Internet.

A digital image is a collection of pixels, typically arranged in an array, which defines an optically formed reproduction of one or more objects, backgrounds or other features of a scene and may be stored in a data file. In a visual image, each of the pixels represents or identifies a color or other light condition associated with a portion of such objects, backgrounds or features. For example, a black-and-white visual image includes a single bit for representing a light condition of the pixel in a binary fashion (e.g., either black or white), while a grayscale visual image may represent the light condition in multiple bits (e.g., two to eight bits for defining tones of gray in terms of percentages or shares of black-and-white), and a color visual image may include groups of bits corresponding to each of a plurality of base colors (e.g., red, green or blue), and the groups of bits may collectively represent a color associated with the pixel. A depth image is also a collection of pixels that defines an optically formed reproduction of one or more objects, backgrounds or other features of a scene, and may also be stored in a data file. Unlike the pixels of a visual image, however, each of the pixels of a depth image represents or identifies not a light condition or color of such objects, backgrounds or features, but a distance to objects, backgrounds or features. For example, a pixel of a depth image may represent a distance between a sensor of an imaging device that captured the depth image (e.g., a depth camera or range sensor) and the respective object, background or feature to which the pixel corresponds.

Imaging data files that are stored in one or more data stores may be printed onto paper, presented on one or more computer displays, or subjected to one or more analyses, such as to identify items expressed therein. Such data files may be stored in any number of formats, including but not limited to JPEG or JPG files, or Graphics Interchange Format (or ".GIF"), Bitmap (or ".BMP"), Portable Network Graphics (or ".PNG"), Tagged Image File Format (or ".TIFF") files, Audio Video Interleave (or ".AVI"), Quick-Time (or ".MOV"), Moving Picture Experts Group (or ".MPG," ".MPEG" or ".MP4") or Windows Media Video (or ".WMV") files.

Reflected light may be captured or detected by an imaging device if the reflected light is within the device's field of view, which is defined as a function of a distance between a sensor and a lens within the device, viz., a focal length, as well as a location of the device and an angular orientation of the device's lens. Accordingly, where an object appears within a depth of field, or a distance within the field of view where the clarity and focus is sufficiently sharp, an imaging device may capture light that is reflected off objects of any kind to a sufficiently high degree of resolution using one or more sensors thereof, and store information regarding the reflected light in one or more data files.

Many imaging devices also include manual or automatic features for modifying their respective fields of view or orientations. For example, a digital camera may be configured in a fixed position, or with a fixed focal length (e.g., fixed-focus lenses) or angular orientation. Alternatively, an imaging device may include one or more actuated or motorized features for adjusting a position of the imaging device, or for adjusting either the focal length (e.g., zooming the imaging device) or the angular orientation (e.g., the roll angle, the pitch angle or the yaw angle), by causing a change in a distance between the sensor and the lens (e.g., optical zoom lenses or digital zoom lenses), a change in a location of the imaging device, or a change in one or more of the angles defining an angular orientation.

For example, an imaging device may be hard-mounted to a support or mounting that maintains the device in a fixed configuration or angle with respect to one, two or three axes. Alternatively, however, an imaging device may be provided with one or more motors and/or controllers for manually or automatically operating one or more of the components, or for reorienting the axis or direction of the device, i.e., by panning or tilting the device. Panning an imaging device may cause a rotation within a horizontal plane or about a vertical axis (e.g., a yaw), while tilting an imaging device may cause a rotation within a vertical plane or about a horizontal axis (e.g., a pitch). Additionally, an imaging device may be rolled, or rotated about its axis of rotation, and within a plane that is perpendicular to the axis of rotation and substantially parallel to a field of view of the device.

Some imaging devices may digitally or electronically adjust an image identified in a field of view, subject to one or more physical and operational constraints. For example, a digital camera may virtually stretch or condense the pixels of an image in order to focus or broaden the field of view of the digital camera, and also translate one or more portions of images within the field of view. Imaging devices having optically adjustable focal lengths or axes of orientation are commonly referred to as pan-tilt-zoom (or "PTZ") imaging devices, while imaging devices having digitally or electronically adjustable zooming or translating features are commonly referred to as electronic PTZ (or "ePTZ") imaging devices.

Information and/or data regarding features or objects expressed in imaging data, including colors, textures or outlines of the features or objects, may be extracted from the data in any number of ways. For example, colors of pixels, or of groups of pixels, in a digital image may be determined and quantified according to one or more standards, e.g., the RGB ("red-green-blue") color model, in which the portions of red, green or blue in a pixel are expressed in three corresponding numbers ranging from 0 to 255 in value, or a hexadecimal model, in which a color of a pixel is expressed in a six-character code, wherein each of the characters may have a range of sixteen. Colors may also be expressed according to a six-character hexadecimal model, or #NNNNNN, where each of the characters N has a range of sixteen digits (i.e., the numbers 0 through 9 and letters A through F). The first two characters NN of the hexadecimal model refer to the portion of red contained in the color, while the second two characters NN refer to the portion of green contained in the color, and the third two characters NN refer to the portion of blue contained in the color. For example, the colors white and black are expressed according to the hexadecimal model as #FFFFFF and #000000, respectively, while the color national flag blue is expressed as #31314A. Any means or model for quantifying a color or color schema within an image or photograph may be utilized in accordance with the present disclosure. Moreover, textures or features of objects expressed in a digital image may be identified using one or more computer-based methods, such as by identifying changes in intensities within regions or sectors of the image, or by defining areas of an image corresponding to specific surfaces.

Furthermore, edges, contours, outlines, colors, textures, silhouettes, shapes or other characteristics of objects, or portions of objects, expressed in still or moving digital images may be identified using one or more algorithms or machine-learning tools. The objects or portions of objects may be stationary or in motion, and may be identified at single, finite periods of time, or over one or more periods or durations. Such algorithms or tools may be directed to recognizing and marking transitions (e.g., the edges, contours, outlines, colors, textures, silhouettes, shapes or other characteristics of objects or portions thereof) within the digital images as closely as possible, and in a manner that minimizes noise and disruptions, and does not create false transitions. Some detection algorithms or techniques that may be utilized in order to recognize characteristics of objects or portions thereof in digital images in accordance with the present disclosure include, but are not limited to, Canny edge detectors or algorithms; Sobel operators, algorithms or filters; Kayyali operators; Roberts edge detection algorithms; Prewitt operators; Frei-Chen methods; or any other algorithms or techniques that may be known to those of ordinary skill in the pertinent arts.

Distances (or depths or ranges) to objects that are represented in a pair of stereo images captured by imaging devices (e.g., digital cameras) having fields of view that overlap, at least partially, may be determined. For each point of each object that appears in both of the images, lines extending from the respective lenses, lens modules or other sensors of the respective imaging devices through representations of the points of the objects in each of the images will virtually intersect at a location corresponding to the actual position of that point, in three-dimensional space. Through the use of traditional geometric principles and properties, e.g., the properties of similar triangles, as well as the known or knowable variables such as baseline distance or separation between the imaging devices, the disparity between the points within the respective images and the focal lengths of the respective imaging devices, coordinates of the intersecting point may be determined accordingly. In some embodiments, the imaging devices may each have the same focal length. In other embodiments, the imaging devices may each have different focal lengths.

Where a point in space appears in two images captured by two imaging devices, a plane defined by positions of image sensors of the imaging devices and an actual position of the point in space is called an epipolar plane. The images may then be co-aligned based on their contents, e.g., along lines corresponding to intersections of the epipolar plane with the respective image planes. After the images have been aligned based on their contents, an actual position of an object may be determined by triangulating lines extending from lenses, lens modules or other sensors of an imaging device through representations of the points in the respective images within their image planes. An intersection of such lines corresponds to the actual position of the point, and a range or a distance to the point may be determined accordingly based on this actual position. Stereo ranging algorithms and techniques may be used to determine ranges or distances to each of the points that appears in both of the images, and such ranges or distances may be used to define a point cloud, a depth map or another three-dimensional model of the environment in which the object is provided. The depth model may be stored in a data file (e.g., a depth image) or utilized for any purpose, including but not limited to navigation, guidance, monitoring or collision avoidance.

Stereo ranging algorithms and techniques thus require determining correspondences of common points in three-dimensional space. When a plurality of correspondences are identified from each of a pair of images of a scene, disparities for each of the conjugate pairs of points may be determined, and a map of such disparities that mimics a three-dimensional structure of the scene may be reconstructed accordingly if information regarding aspects of the scene, e.g., geometric parameters such as the baseline distance or separation, the focal lengths of the imaging devices and others, is known.

There are a number of computer-based stereo ranging algorithms and techniques for determining real-world positions of points expressed in pairs of images of scenes, and for generating depth maps, point clouds or other three-dimensional representations of such scenes based on such positions. Such algorithms or techniques may aid in the performance of calibration, correspondence and/or reconstruction functions. For example, the Open Source Computer Vision (or "OpenCV") library includes a number of computer-based algorithms or other programming functions that are directed to determining distances or ranges from pairs of images. Similarly, a number of other stereo ranging algorithms or techniques programmed in the MATLAB language are publicly available. Computer-based algorithms or techniques are available from a number of other sources, as well.

Imaging devices may be mounted to aerial vehicles horizontally or vertically, e.g., in forward or aft orientations, or in upward or downward orientations, or at any other orientations or angles, which may be relative or absolute. The digital cameras may be homogenous (e.g., functionally equivalent or having the same capacities) or, alternatively, heterogeneous (e.g., having different capacities), and stereo images captured by such cameras for determining depths may be processed in multiple calculations. Images captured by each of the imaging devices may be used for stereo ranging purposes, e.g., by determining baseline distances or separations between such imaging devices, disparities of objects within such images, and focal lengths of the respective imaging devices.

Stereo ranging typically requires pairs of cameras to be calibrated with a high degree of precision, in order to ensure that the cameras record points on the scene at exactly the same corresponding locations. Due to the demands of high precision, stereo cameras that are provided aboard aerial vehicles are usually supported with rigid, heavy structures that may adversely affect the operation of the aerial vehicles. For example, a mass, a shape or another attribute of a stereo rig or another mounting structure may limit the maximum range, speed or altitude of an aerial vehicle during the performance of one or more missions, or otherwise reduce the aerial vehicle's fuel economy or effectiveness in completing the mission.

As is discussed above, the systems and methods of the present disclosure are directed to pairs of digital cameras or other imaging devices that are used in stereo ranging or other applications, and are configured to calibrate themselves based on fiducials or other markings that are provided within their respective fields of view. In particular, the fiducials or other markings may be explicitly designed for this purpose, e.g., by applying such markings to one or more surfaces of the aerial vehicle within fields of view of two or more digital cameras, or implicitly adopted, such as where one or more features of the aerial vehicle within such fields of view may also serve as a fiducial or another marking. For example, the fiducials or other markings may be circles, triangles, stars or other shapes applied to a rudder, a wing panel or another feature within fields of view of two or more digital cameras that may be detected in images captured by the digital cameras using one or more computer vision algorithms.

In some embodiments of the present disclosure, a pair of digital cameras may be calibrated in order to determine their respective parameters, including but not limited to intrinsic parameters such as focal lengths, optical centers (or image centers) of image frames, or other parameters regarding lens distortions, as well as extrinsic parameters such as their respective rotations (e.g., yaw angles, pitch angles and/or roll angles) or translations. Based on parameters determined as a result of digital camera calibration, Referring to FIG. 2, a block diagram of one system 200 including a self-calibrating stereo camera pair in accordance with embodiments of the present disclosure is shown. The system 200 of FIG. 2 includes an aerial vehicle 210 and a data processing system 280 connected to one another over a network 290, which may include the Internet, in whole or in part. Except where otherwise noted, reference numerals preceded by the number "2" shown in FIG. 2 indicate components or features that are similar to components or features having reference numerals preceded by the number "1" shown in FIGS. 1A through 1L.

The aerial vehicle 210 includes a processor 212, a memory 214 and a transceiver 216. The aerial vehicle 210 further includes a control system 220, a plurality of propulsion motors 230-1, 230-2 . . . 230-$m$, and a plurality of imaging devices 240-1 . . . 240-$n$.

The processor 212 may be configured to perform any type or form of computing function associated with the operation of the aerial vehicle 210, including but not limited to the execution of one or more object recognition algorithms or techniques. For example, the processor 212 may be configured to execute any other algorithms or techniques (e.g., machine learning systems or techniques) associated with one or more applications, purposes or functions, such as navigation, monitoring or collision avoidance, or to select at least one of a course, a speed or an altitude for the safe operation of the aerial vehicle 210. For example, the processor 212 may be configured to control any aspects of the operation of the aerial vehicle 210 and the one or more computer-based components thereon, including but not limited to the propulsion motors 230-1, 230-2 . . . 230-$m$ or the imaging devices 240-1 . . . 240-$n$. For example, the processor 212 may control the operation of one or more control systems or modules, such as the control system 220, for generating instructions for conducting operations of one or more of the propulsion motors 230-1, 230-2 . . . 230-$m$ or the imaging devices 240-1 . . . 240-$n$. Such control systems or modules may be associated with one or more other computing devices or machines, and may communicate with the data processing system 280 or one or more other computer devices (not shown) over the network 290, through the sending and receiving of digital data.

The processor 212 may be a uniprocessor system including one processor, or a multiprocessor system including several processors (e.g., two, four, eight, or another suitable number), and may be capable of executing instructions. For example, in some embodiments, the processor 212 may be a general-purpose or embedded processor unit such as a CPU or a GPU having any number of instruction set architectures (ISAs), such as the x86, PowerPC, SPARC, or MIPS ISAs, or any other suitable ISA. Where the processor 212 is a multiprocessor system, each of the processors within the multiprocessor system may operate the same ISA, or different ISAs.

Additionally, the aerial vehicle 210 further includes one or more memory or storage components 214 (such as databases or data stores) for storing any type of information or data, e.g., instructions for operating the aerial vehicle 210, or information or data captured during operations of the aerial vehicle 210. The memory 214 may be configured to store executable instructions, imaging data, flight paths, flight control parameters and/or other data items accessible by or to the processor 212. The memory 214 may be implemented using any suitable memory technology, such as random-access memory (or "RAM"), static RAM (or "SRAM"), synchronous dynamic RAM (or "SDRAM"), nonvolatile/Flash-type memory, or any other type of memory. In some embodiments, program instructions, imaging data, flight paths, flight control parameters and/or other data items may be received or sent via the transceiver 216, e.g., by transmission media or signals, such as electrical, electromagnetic, or digital signals, which may be conveyed via a communication medium such as a wired and/or a wireless link.

The transceiver 216 may be configured to enable the aerial vehicle 210 to communicate through one or more wired or wireless means, e.g., wired technologies such as Universal Serial Bus (or "USB") or fiber optic cable, or standard wireless protocols such as Bluetooth® or any Wireless Fidelity (or "Wi-Fi") protocol, such as over the network 290 or directly. The transceiver 216 may further include or be in communication with one or more input/output (or "I/O") interfaces, network interfaces and/or input/output devices, and may be configured to allow information or data to be exchanged between one or more of the components of the aerial vehicle 210, or to one or more other computer devices or systems (e.g., other aerial vehicles, not shown) via the network 290. For example, in some embodiments, the transceiver 216 may be configured to coordinate I/O traffic between the processor 212 and one or more onboard or external computer devices or components, e.g., the control system 220, the propulsion motors 230-1, 230-2 . . . 230-m or the imaging devices 240-1 . . . 240-n. The transceiver 216 may perform any necessary protocol, timing or other data transformations in order to convert data signals from a first format suitable for use by one component into a second format suitable for use by another component. In some embodiments, the transceiver 216 may include support for devices attached through various types of peripheral buses, e.g., variants of the Peripheral Component Interconnect (PCI) bus standard or the Universal Serial Bus (USB) standard. In some other embodiments, functions of the transceiver 216 may be split into two or more separate components, or integrated with the processor 212.

In some embodiments, one or more aspects of the aerial vehicle 210 may include one or more visible markings provided thereon, and within the fields of view of the imaging devices 240-1 . . . 240-n. For example, such markings may include one or more lines, shapes, patterns, colors, textures, trademarks, alphanumeric characters, symbols or any other markings that may be detected and recognized within imaging data captured using one or more of the imaging devices 240-1 . . . 240-n.

The control system 220 may include one or more electronic speed controls, power supplies, navigation systems and/or payload engagement controllers for controlling the operation of the aerial vehicle 210 and for engaging with or releasing items, as desired. For example, the control system 220 may be configured to cause or control the operation of one or more of the propulsion motors 230-1, 230-2 . . . 230-m or the imaging devices 240-1 . . . 240-n, such as to cause one or more of the propulsion motors 230-1, 230-2 . . . 230-m to rotate propellers at desired speeds, in order to guide the aerial vehicle 210 along a determined or desired flight path, and to cause one or more of the imaging devices 240-1 . . . 240-n to capture any imaging data (e.g., still or moving images) as well as any associated audio data and/or metadata. The control system 220 may also operate the one or more propulsion motors 230-1, 230-2 . . . 230-m to cause such propellers to be aligned in selected positions or angles. The control system 220 may further control any other aspects of the aerial vehicle 210, including but not limited to the operation of one or more control surfaces (not shown) such as wings, rudders, flaperons, elevons, elevators, ailerons, flaps, brakes, slats or other features within desired ranges, or the enactment with or release of one or more items by one or more engagement systems (not shown). In some embodiments, the control system 220 may be integrated with one or more of the processor 212, the memory 214 and/or the transceiver 216.

The propulsion motors 230-1, 230-2 . . . 230-m may be any type or form of motor (e.g., electric, gasoline-powered or any other type of motor) capable of generating sufficient rotational speeds of one or more propellers or other components to provide lift and/or thrust forces to the aerial vehicle 210 and any payload engaged thereby, to aerially transport the engaged payload thereby. In some embodiments, one or more of the propulsion motors 230-1, 230-2 . . . 230-m may be a brushless DC multi-phase motor such as an outrunner brushless motor or an inrunner brushless motor.

The aerial vehicle 210 may include any number of such propulsion motors 230-1, 230-2 . . . 230-m of any kind. For example, one or more of the propulsion motors 230-1, 230-2 . . . 230-m may be aligned or configured to provide forces of lift to the aerial vehicle 210, exclusively, while one or more of the propulsion motors 230-1, 230-2 . . . 230-m may be aligned or configured to provide forces of thrust to the aerial vehicle 210, exclusively. Alternatively, one or more of the propulsion motors 230-1, 230-2 . . . 230-m may be aligned or configured to provide forces of lift and forces of thrust to the aerial vehicle 210, as needed. For example, the propulsion motors 230-1, 230-2 . . . 230-m may be fixed in their orientation on the aerial vehicle 210, or configured to vary their respective orientations, e.g., a tilt-rotor aircraft. Moreover, the propulsion motors 230-1, 230-2 . . . 230-m may be aligned or configured to operate with different capacities or ratings, or at different speeds, or coupled to propellers having different sizes and shapes. Additionally, one or more of the propulsion motors 230-1, 230-2 . . . 230-m may be an electric motor, e.g., a brushless DC multi-phase motor, and one or more of the propulsion motors 230-1, 230-2 . . . 230-*m* may be a gasoline-powered motor.

Each of the propulsion motors 230-1, 230-2 . . . 230-*m* may be coupled to one or more propellers (or rotors or rotatable systems) having a plurality of shaped blades joined to a hub or boss. For example, each of such propellers may be rotatably mounted to a mast or shaft associated with a respective one of the propulsion motors 230-1, 230-2 . . . 230-*m* and configured to generate forces of thrust when rotated within a fluid. Each of such propellers may include any number of blades, and may be fixed pitch, adjustable pitch or variable pitch in nature. Moreover, one or more of such propellers may be banded or shielded in any manner.

In some embodiments, one or more of the propellers may be configured to rotate about a vertical axis, and to provide forces of lift in a vertical direction (e.g., upward) accordingly. In some other embodiments, one or more of the propellers may be configured to rotate about a horizontal axis, and to provide forces of thrust in a horizontal direction (e.g., forward) accordingly. In still other embodiments, one or more of the propellers may be configured to rotate about axes that are neither horizontal nor vertical, and to provide forces of lift and/or thrust in directions corresponding to such axes accordingly.

Figure 2:
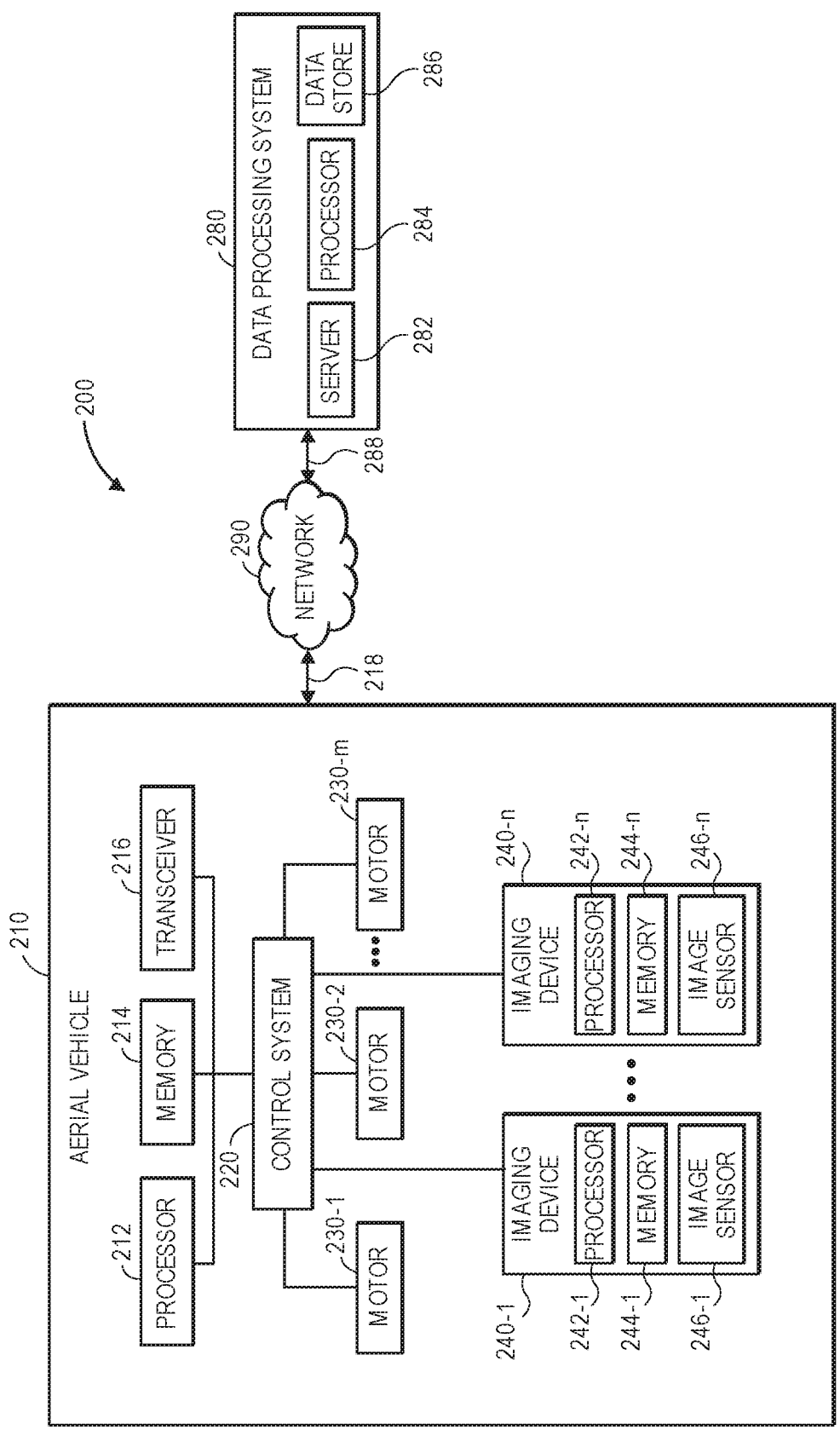
FIG. 2 is a block diagram of one system including a self-calibrating stereo camera pair in accordance with embodiments of the present disclosure.

Although the block diagram of FIG. 2 includes three boxes corresponding to propulsion motors 230-1, 230-2 . . . 230-*m*, those of ordinary skill in the pertinent arts will recognize that any number or type of propulsion motors may be provided aboard the aerial vehicle 210 in accordance with the present disclosure.

The imaging devices 240-1 . . . 240-*n* may be any form of optical recording devices that may be aligned with respect to any expected or ordinary operating orientation of the aerial vehicle 210, and are configured to photograph or otherwise record imaging data of objects or any other elements within fields of view forward of, aft of, lateral to, above or below the aerial vehicle 210, or for any other purpose. The imaging devices 240-1 . . . 240-*n* may include one or more processors 242-1 . . . 242-*n*, one or more memory or storage components 244-1 . . . 244-*n*, and one or more image sensors 246-1 . . . 246-*n*, e.g., color sensors, grayscale sensors, black-and-white sensors, depth sensors, or the like, and may further include one or more photosensitive surfaces, filters, chips, electrodes, clocks, boards, timers, power sources, connectors or any other relevant features (not shown). Such imaging devices 240-1 . . . 240-*n* may capture imaging data in the form of one or more still or moving images of any kind or form, as well as any relevant audio signals or other information during the operation of the aerial vehicle 210.

The imaging devices 240-1 . . . 240-*n* may be mounted, fixed, embedded or otherwise joined to one or more external surfaces of the aerial vehicle 210 in any manner and in any orientation or alignment to capture imaging data from above the aerial vehicle 210. For example, one or more of the imaging devices 240-1 . . . 240-*n* may be coupled to any form of support system or structure for maintaining the lenses or other optical elements of the imaging devices 240-1 . . . 240-*n* at a selected orientation or configuration. Alternatively, the imaging devices 240-1 . . . 240-*n* may be mounted, fixed, embedded or otherwise joined to external surfaces of the aerial vehicle 210 in any other manner.

The imaging devices 240-1 . . . 240-*n* may communicate with the processor 212 and/or the control system 220, or with one another, by way of a wired or wireless connection that may be dedicated or comprise all or part of an internal network (not shown), e.g., an internal communications bus. Additionally, the imaging devices 240-1 . . . 240-*n* may be adapted or otherwise configured to communicate with the data processing system 280 by way of the network 290. Although the block diagram of FIG. 2 includes two boxes corresponding to imaging devices 240-1 . . . 240-*n*, those of ordinary skill in the pertinent arts will recognize that any number or type of imaging devices may be provided aboard the aerial vehicle 210 in accordance with the present disclosure, including but not limited to digital cameras, depth sensors or range cameras, infrared cameras, radiographic cameras or other optical sensors.

In addition to the imaging devices 240-1 . . . 240-*n*, the aerial vehicle 210 may also include any number of other sensors, components or other features for controlling or aiding in the operation of the aerial vehicle 210, including but not limited to one or more environmental or operational sensors for determining one or more attributes of an environment in which the aerial vehicle 210 is operating, or may be expected to operate, including extrinsic information or data or intrinsic information or data. For example, the aerial vehicle 210 may include one or more Global Positioning System ("GPS") receivers or sensors, compasses, speedometers, altimeters, thermometers, barometers, hygrometers, gyroscopes, air monitoring sensors (e.g., oxygen, ozone, hydrogen, carbon monoxide or carbon dioxide sensors), ozone monitors, pH sensors, magnetic anomaly detectors, metal detectors, radiation sensors (e.g., Geiger counters, neutron detectors, alpha detectors), attitude indicators, depth gauges, accelerometers, or sound sensors (e.g., microphones, piezoelectric sensors, vibration sensors or other transducers for detecting and recording acoustic energy from one or more directions).

The data processing system 280 includes one or more physical computer servers 282 having one or more computer processors 284 and any number of data stores 286 (e.g., databases) associated therewith, as well as provided for any specific or general purpose. For example, the data processing system 280 of FIG. 2 may be independently provided for the exclusive purpose of receiving, analyzing or storing imaging data or other information or data received from the aerial vehicle 210 or, alternatively, provided in connection with one or more physical or virtual services configured to receive, analyze or store such imaging data or other information or data, as well as one or more other functions. The servers 282 may be connected to or otherwise communicate with the processors 284 and the data stores 286, which may store any type of information or data, including but not limited to acoustic signals, information or data relating to imaging data, or information or data regarding environmental conditions, operational characteristics, or positions, for any purpose. The servers 282 and/or the computer processors 284 may also connect to or otherwise communicate with the network 290, as indicated by line 288, through the sending and receiving of digital data. For example, the data processing system 280 may include any facilities, stations or locations having the ability or capacity to receive and store information or data, such as media files, in one or more data stores, e.g., media files received from the aerial vehicle 210, or from one another, or from one or more other external computer systems (not shown) via the network 290. In some embodiments, the data processing system 280 may be provided in a physical location. In other such embodiments, the data processing system 280 may be provided in one or more alternate or virtual locations, e.g., in a "cloud"-based environment. In still other embodiments, the data processing system 280 may be provided onboard one or more aerial vehicles, including but not limited to the aerial vehicle 210.

The network 290 may be any wired network, wireless network, or combination thereof, and may comprise the Internet in whole or in part. In addition, the network 290 may be a personal area network, local area network, wide area network, cable network, satellite network, cellular telephone network, or combination thereof. The network 290 may also be a publicly accessible network of linked networks, possibly operated by various distinct parties, such as the Internet. In some embodiments, the network 290 may be a private or semi-private network, such as a corporate or university intranet. The network 290 may include one or more wireless networks, such as a Global System for Mobile Communications (GSM) network, a Code Division Multiple Access (CDMA) network, a Long-Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like, or to "select" an item, link, node, hub or any other aspect of the present disclosure.

The aerial vehicle 210 and/or the data processing system 280 may use any web-enabled or Internet applications or features, or any other client-server applications or features including E-mail or other messaging techniques, to connect to the network 290, or to communicate with one another, such as through short or multimedia messaging service (SMS or MMS) text messages. For example, the aerial vehicle 210 may be adapted to transmit information or data in the form of synchronous or asynchronous messages to the data processing system 280 or to any other computer device (e.g., to one or more other aerial vehicles) in real time or in near-real time, or in one or more offline processes, via the network 290. Those of ordinary skill in the pertinent art would recognize that the aerial vehicle 210 or the data processing system 280 may operate or be operated by any of a number of computing devices that are capable of communicating over the network, including but not limited to set-top boxes, personal digital assistants, digital media players, web pads, laptop computers, desktop computers, electronic book readers, and the like. The protocols and components for providing communication between such devices are well known to those skilled in the art of computer communications and need not be described in more detail herein.

The data and/or computer-executable instructions, programs, firmware, software and the like (also referred to herein as "computer-executable" components) described herein may be stored on a computer-readable medium that is within or accessible by computers or computer components such as the processor 212 or the processors 284, or any other computers or control systems utilized by the aerial vehicle 210 or the data processing system 280 (e.g., by one or more other aerial vehicles), and having sequences of instructions which, when executed by a processor (e.g., a CPU or GPU), cause the processor to perform all or a portion of the functions, services and/or methods described herein. Such computer-executable instructions, programs, software, and the like may be loaded into the memory of one or more computers using a drive mechanism associated with the computer readable medium, such as a floppy drive, CD-ROM drive, DVD-ROM drive, network interface, or the like, or via external connections.

Some embodiments of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, embodiments may also be provided as a computer-executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Figure 3:
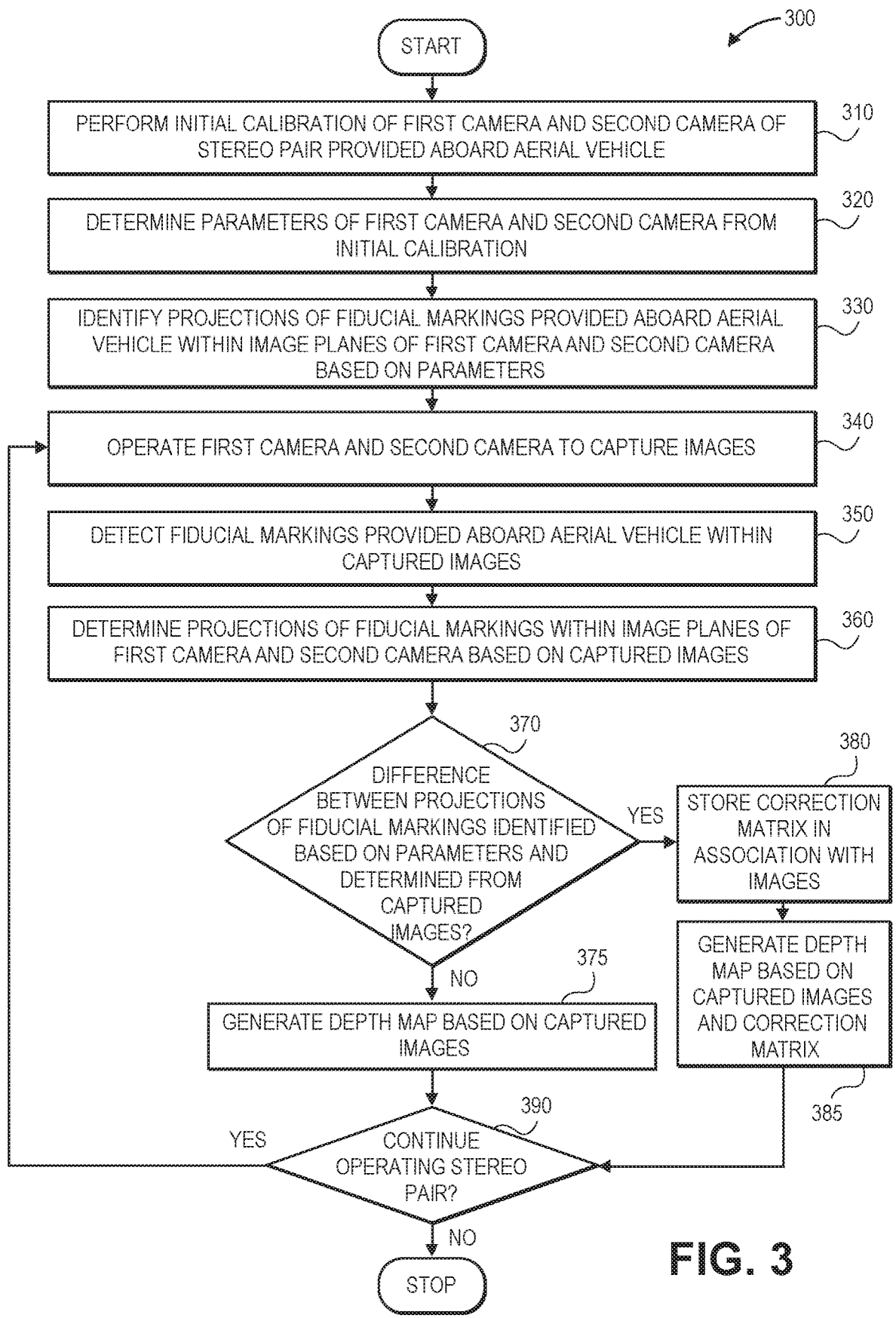
FIG. 3 is a flow chart of one process for utilizing a self-calibrating stereo camera pair in accordance with embodiments of the present disclosure.

As is discussed above, an aerial vehicle may include digital cameras or other imaging devices that are calibrated to determine their respective parameters, both intrinsic and extrinsic, based on the detection of fiducials or other markings provided on surfaces of the aerial vehicle within the respective fields of view of the digital cameras. Referring to FIG. 3, a flow chart 300 of one process for utilizing a self-calibrating stereo camera pair in accordance with embodiments of the present disclosure is shown.

At box 310, an initial calibration of a first camera and a second camera of a stereo camera pair provided aboard an aerial vehicle is performed. The initial calibration may be performed while the aerial vehicle is in flight or grounded, and according to any process or procedure from which intrinsic parameters and extrinsic parameters of the respective cameras may be determined. The first camera and the second camera may be provided at any location or in any configuration on one or more surfaces of the aerial vehicle. For example, the first camera and the second camera may be provided on (e.g., embedded within or mounted to) a forward surface of an airframe of the aerial vehicle, such as is shown in FIGS. 1A and 1B, and aligned in parallel or at other angles to capture images from fields of view that extend forward of the aerial vehicle and overlap at least in part. Alternatively, the first camera and the second camera may be provided on any other surface of an airframe of the aerial vehicle, in parallel or non-parallel orientations. In some embodiments, the first camera may be provided on one or more surfaces of any other type of vehicle, e.g., an autonomous ground vehicle or robot, or any other non-vehicular system. The first camera and the second camera may be configured to capture still images, or moving images, that are in color, grayscale or black-and-white. Alternatively, or additionally, the first camera and the second camera may also be configured to capture depth images, or any other type or form of imaging data, from their respective fields of view.

At box 320, intrinsic parameters and extrinsic parameters of the first camera and the second camera are determined as a result of the initial calibration. For example, in some embodiments, based on the initial calibration, intrinsic parameters regarding the respective internal characteristics of the first camera and the second camera, including but not limited to the focal lengths (e.g., distances between image sensors and image planes), locations of optical centers (e.g., geometric centers or origins of the image planes), measures of skew and distortion or other parameters may be determined. Likewise, in some embodiments, extrinsic parameters of the first camera and the second camera, which describe the positions and orientations of the first camera and the second camera in three-dimensional space, such as the Eulerian angles of the camera and its translation, may also be determined from the initial calibration. In some embodiments, more or fewer intrinsic or extrinsic parameters than those listed above may be determined. For example, in some embodiments, a measure of pixel skew or distortion may also be determined. Furthermore, the parameters may be defined according to any standard, e.g., with distances or areas measured in terms of length or area, or in numbers of pixels.

In some embodiments, a camera matrix may be formed for each of the first camera and the second camera based on the intrinsic parameters and the extrinsic parameters, e.g., by a calibration matrix. A camera matrix may be used to map points in three-dimensional space to pixels within a two-dimensional image plane.

At box 330, projections of fiducial markings provided aboard the aerial vehicle within the image planes of the first camera and the second camera are identified based on the parameters determined at box 320. For example, the markings may include one or more lines, shapes, patterns, colors, textures, trademarks, alphanumeric characters or symbols provided on surfaces of the aerial vehicle that appear within fields of view of the first camera and the second camera. The markings may be provided on fuselages, empennages, struts, mounts, landing gear (e.g., wheels or skids), control surfaces or other components, and the positions of the markings may be identified within the image planes of the first camera and the second camera and/or in three-dimensional space. The projections of each of the fiducial markings within the fields of view of the first camera and the second camera are determined from the intrinsic parameters and the extrinsic parameters.

At box 340, the first camera and the second camera are operated to capture images during operations of the aerial vehicle. For example, the first camera and the second camera may capture visual images (e.g., color, grayscale or black-and-white) at any frame rate, with or without any associated audio data and/or metadata.

At box 350, the fiducial markings provided aboard the aerial vehicle are detected within the images captured by the first camera and the second camera. At box 360, projections of the fiducial markings within the image planes of the first camera and the second camera are determined based on the captured images. For example, such projections may be identified based on any detection or recognition technique, e.g., by detecting any number of edges, contours, outlines, colors, textures, silhouettes, shapes or other characteristics of the fiducial markings, or portions of the fiducial markings, expressed within the images using one or more algorithms or machine-learning tools.

At box 370, whether there are any differences between the projections of the fiducial markings identified based on the intrinsic parameters and/or the extrinsic parameters at box 330, and the projections of the fiducial markings identified within the images captured by the first camera and the second camera at box 360, is determined.

If there are any differences between the projections, then the process advances to box 380, where a correction matrix is stored in association with the images captured by the first camera and the second camera at box 340. The correction matrix may be a complete camera matrix, a complete matrix of intrinsic parameters or extrinsic parameters, or any other set of parameters that establishes or modifies a mapping between real-world objects in three-dimensional space and projections of those objects in an image plane in two-dimensional space. The process then advances to box 385, where a depth map is generated based on the images captured at box 340 and the correction matrix. Alternatively, or additionally, the images captured at box 340 may be utilized for any purpose.

If there are no differences between the projections, then the process advances to box 375, where a depth map is generated based on the images captured at box 340. Alternatively, or additionally, the images captured at box 340 may be utilized for any purpose.

After a depth map is generated, e.g., based on the images captured at box 340, with or without a correction matrix, the process advances to box 390, where whether the continued operation of the first camera and the second camera is desired is determined.

If the continued operation of the first camera and the second camera is desired, then the process returns to box 340, where the first camera and the second camera are operated to capture images, and to box 350, where the fiducial markings provided aboard the aerial vehicle are detected within the images. If the continued operation of the first camera and the second camera is not desired, however, then the process ends.

As is discussed above, where one or more fiducials or other markings are provided on surfaces of an aerial vehicle that remain within fields of view of two or more imaging devices, the imaging devices may be calibrated based on the detection of the fiducials or other markings within imaging data, and recalibrated based on the detection of the fiducials or other markings in subsequently captured imaging data. Referring to FIGS. 4A through 4I, views of aspects of one system including a self-calibrating stereo camera pair in accordance with embodiments of the present disclosure are shown. Except where otherwise noted, reference numerals preceded by the number "4" shown in FIGS. 4A through 4I indicate components or features that are similar to components or features having reference numerals preceded by the number "2" shown in FIG. 2 or by the number "1" shown in FIGS. 1A through 1L.

Figure 4A:
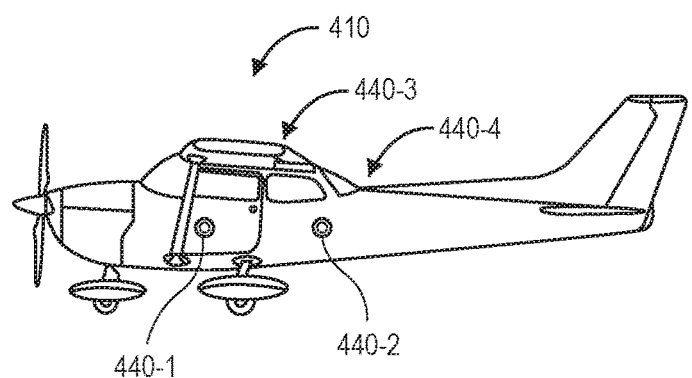
Figure 4B:
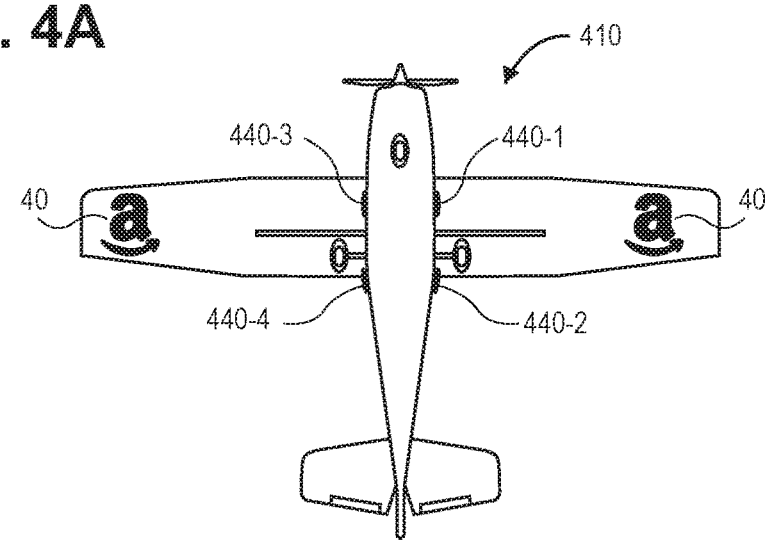
Figure 4C:
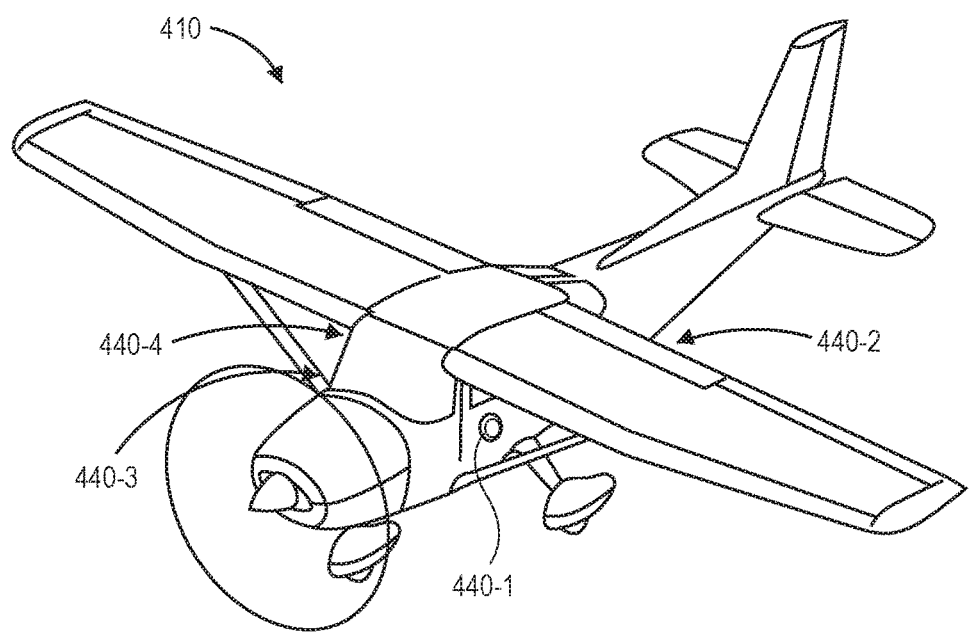

As is shown in FIGS. 4A through 4C, an aerial vehicle 410 (e.g., a single-engine, high wing, fixed-wing aircraft) includes a plurality of digital cameras 440-1, 440-2, 440-3, 440-4. The digital cameras 440-1, 440-2 are aligned with optical axes and fields of view extending from (and overlapping beyond) a port side of the aerial vehicle 410, and the digital cameras 440-3, 440-4 are aligned with optical axes and fields of view extending from (and overlapping beyond) a starboard side of the aerial vehicle 410. Additionally, as is shown in FIG. 4B, the aerial vehicle 410 includes a pair of markings 40 (e.g., symbols) provided on undersides of the fixed wing of the aerial vehicle 410, such that one of the markings 40 is within the fields of view of the digital cameras 440-1, 440-2, and another of the markings 40 is within the fields of view of the digital cameras 440-3, 440-4.

Figure 4D:
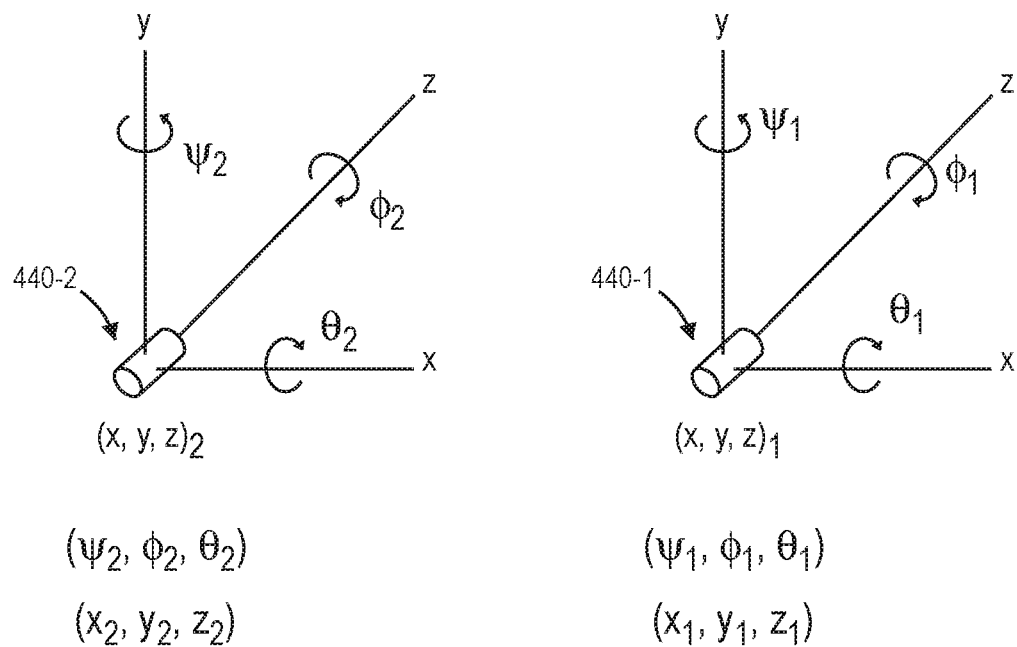

As is discussed above, parameters of digital cameras (e.g., intrinsic parameters and extrinsic parameters) may be determined as a result of an initial calibration, which may be performed according to any procedure in accordance with the present disclosure. For example, as is shown in FIG. 4D, extrinsic parameters of the digital cameras 440-1, 440-2, including but not limited to positions $(x_1, y_1, z_1)$, $(x_2, y_2, z_2)$ of the digital cameras 440-1, 440-2 in three-dimensional space, as well as representations of their respective rotations or alignments $(\psi_1, \theta_1, \phi_1)$, $(\psi_2, \theta_2, \phi_2)$, e.g., yaw angles $\psi_1$, $\psi_2$, pitch angles $\theta_1$, $\theta_2$, and roll angles $_1$, $\phi_2$, of their optical axes, may be determined. Likewise, as is shown in FIG. 4E, intrinsic parameters of the digital cameras 440-1, 440-2, including but not limited to focal lengths $f_1$, $f_2$ of the digital cameras 440-1, 440-2, or optical centers $(C_x, C_y)_1$, $(C_x, C_y)_2$ of image planes 45-1, 45-2 of the digital cameras 440-1, 440-2, or skew angles $\alpha_1$, $\alpha_2$ (or coefficients) of sets of pixels $P_1$, $P_2$ having dimensions $(p_x, p_y)_1$, $(p_x, p_y)_2$ may be determined.

Figure 4F:
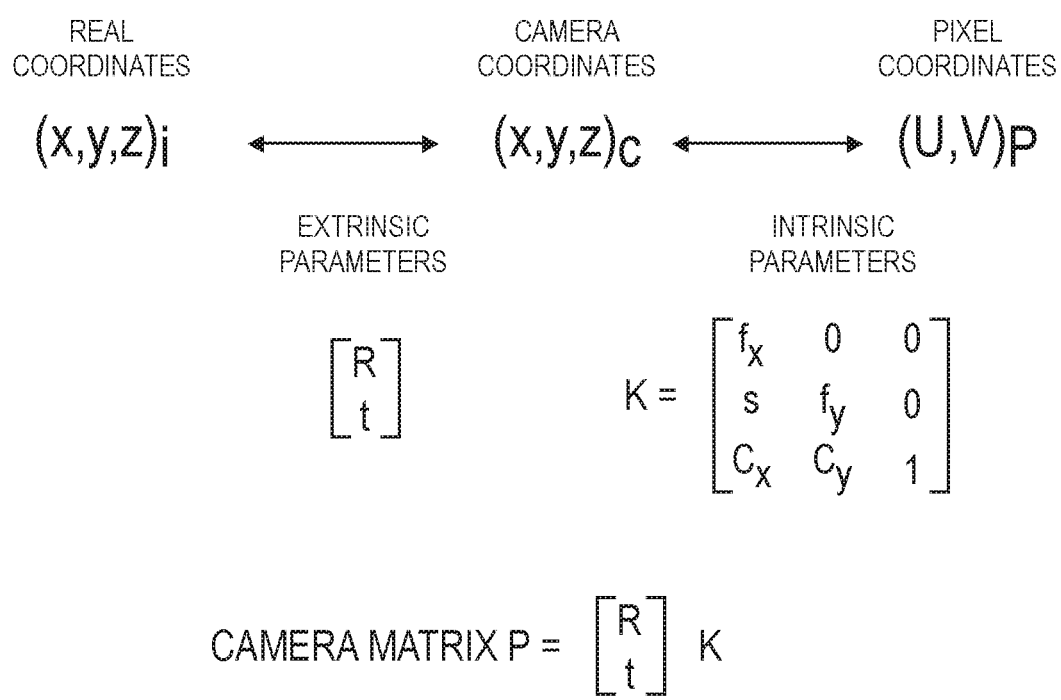

As is discussed above, camera matrices may be generated for each of the digital cameras 440-1, 440-2, 440-3, 440-4 based on the parameters determined from the initial calibration. For example, as is shown in FIG. 4F, a camera matrix P relating real world coordinates of a point $(x, y, z)_i$ to coordinates of one of the respective digital cameras $(x, y, z)_C$ and to coordinates of a pixel $(u, v)_P$ depicting the point within an image plane of the one of the respective digital cameras may be determined as a product of an intrinsic parameter matrix K and an extrinsic parameter matrix [R|t]. In some embodiments, the extrinsic parameter matrix [R|t] includes one or more measures of a digital camera's rotation and translation, e.g., based on the position and the Eulerian angles of the digital camera, such as those that are shown in FIG. 4D.

Additionally, the intrinsic parameter matrix K may be a 3×3 matrix including values $f_x$, $f_y$ corresponding to a focal length of a digital camera in pixels, as well as a skew coefficient s, or a relation between the pixel skew and dimensions of a pixel within the image plane, e.g., in world units, and values $C_x$, $C_y$ of the optical center (or principal point) of the image plane, in pixels, such as is shown in FIG. 4E.

Figure 4G:
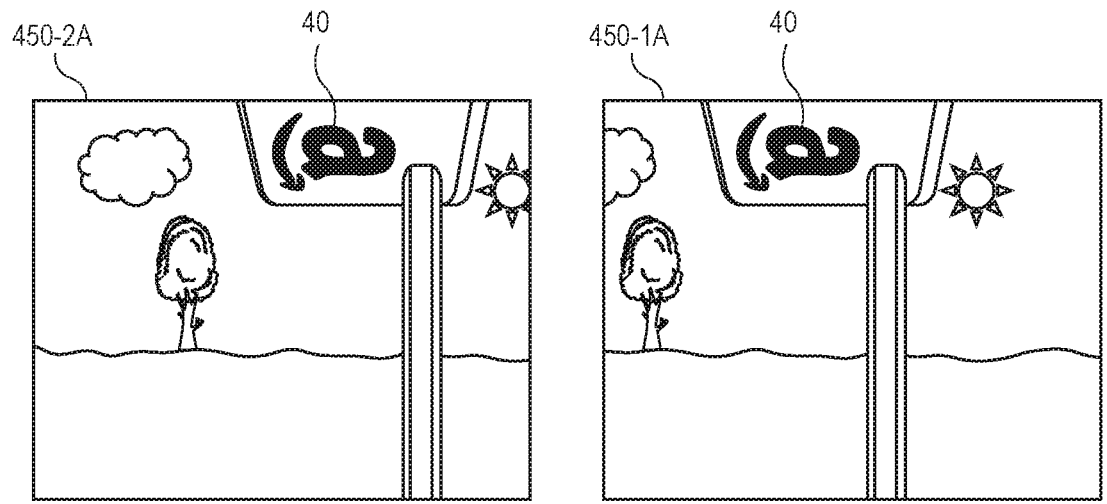
Figure 4H:
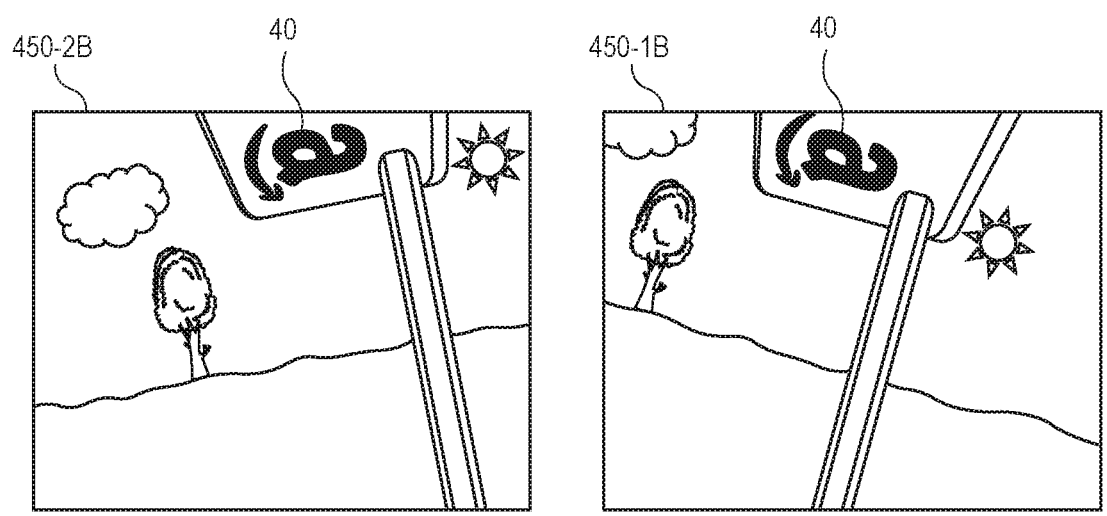

As is also discussed above, where a fiducial or other marking, such as the markings 40, appears within fields of view of two or more digital cameras, deviations in the projections of the fiducial or the other markings with images captured by the digital cameras may be detected and used to derive correction parameters (e.g., a correction matrix) for one or both of the digital cameras, or as an indication that maintenance or adjustments may be required. For example, as is shown in FIG. 4G, where a pair of images 450-1A, 450-2A are captured following the initial calibration using the digital cameras 440-1, 440-2, respectively, the images 450-1A, 450-2A may be processed to detect projections of the markings 40 within the respective images 450-1A, 450-2A. Similarly, as is shown in FIG. 4H, where a pair of images 450-1B, 450-2B are captured following flight operations of the aerial vehicle 410, the images 450-1B, 450-2B may be processed to detect projections of the markings 40 within the respective images 450-1B, 450-2B, which may be used for any additional purpose, such as to determine depths or ranges to foreground or background objects appearing within the respective images 450-1B, 450-2B.

Figure 4I:
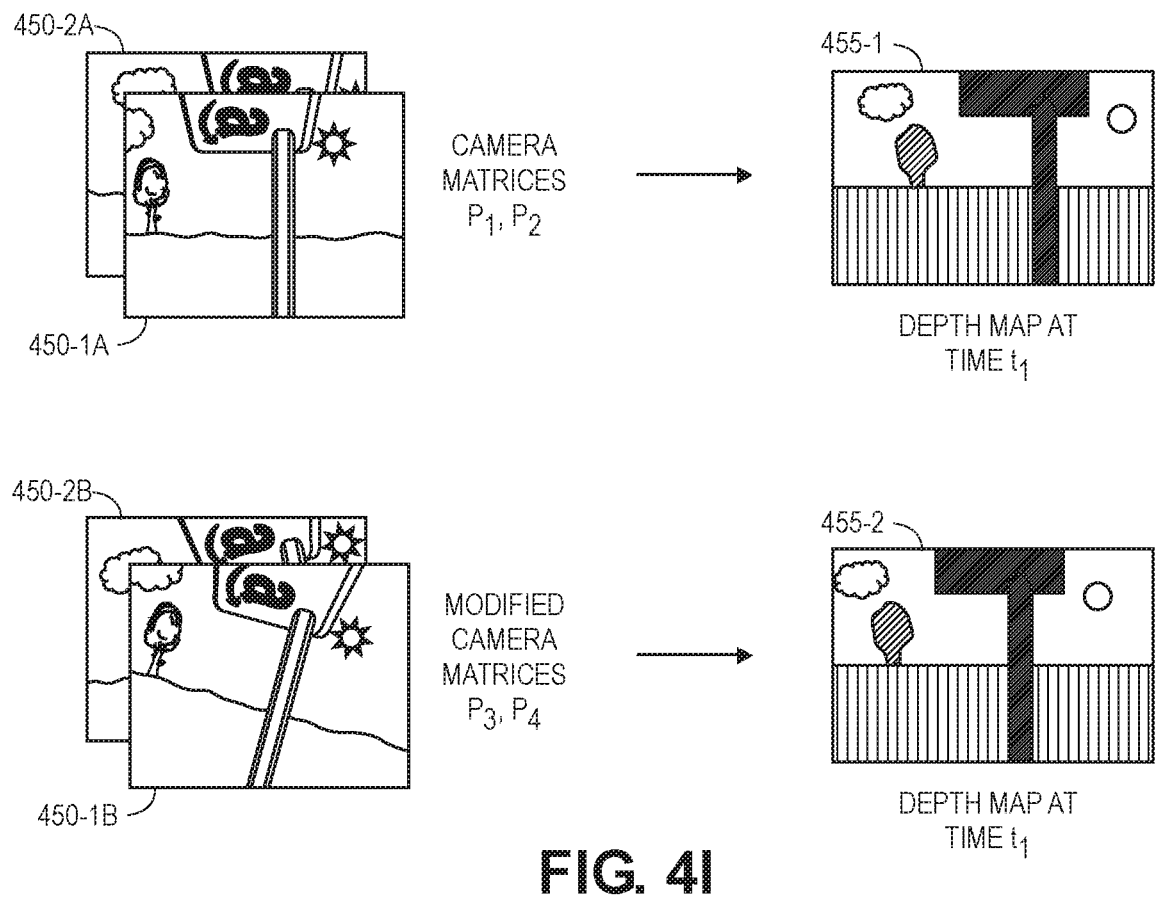

As is shown in FIG. 4I, a depth map 455-1 corresponding to distances or ranges to points appearing within fields of view of the digital cameras 440-1, 440-2 at time $t_1$ may be created based on the images 450-1, 450-2 based on the camera matrices $P_1$, $P_2$.

When projections of the markings 40 are different within the images 450-1A, 450-1B captured at times $t_1$ and $t_2$ using the digital camera 440-1, or when projections of the markings 40 are different within the images 450-2A, 450-2B captured at times $t_1$ and $t_2$ using the digital camera 440-2, the differences between the projections may be used to recalibrate the digital cameras 440-1, 440-2, or to otherwise compensate for the differences in the projections of the markings 40. For example, as is also shown in FIG. 4I, where camera matrices $P_1$, $P_2$ are calculated for the digital cameras 440-1, 440-2 following an initial calibration, and the projections of the markings 40 within the images 450-1B, 450-2B captured at time $t_2$ are determined to be different from the projections of the markings 40 within the images 450-1A, 450-2A captured at time $t_1$, modified camera matrices $P_3$, $P_4$ may be calculated for the digital cameras 440-1, 440-2 based on the projections of the markings 40 within the images 450-1B, 450-2B, and stored in association with the images 450-1B, 450-2B.

The modified camera matrices $P_3$, $P_4$ may be further used to generate a depth map 455-2 corresponding to distances or ranges to points appearing within fields of view of the digital cameras 440-1, 440-2 at time $t_2$, e.g., in real time or near-real time, or at a later time. Subsequently, projections of the markings 40 appearing within images captured after time $t_2$ may be compared to projections of the markings 40 within the images 450-1B, 450-2B, and, upon determining an error or deviation in the projections of the markings 40 within such images, new camera matrices may be generated for one or both of the digital cameras 440-1, 440-2.

Although some of the embodiments disclosed herein reference the operation of unmanned aerial vehicles having stereo pairs of digital cameras, those of ordinary skill in the pertinent arts will recognize that the systems and methods disclosed herein are not so limited, and may be utilized with any type of or other system having two or more calibrated digital cameras or other imaging devices having overlapping fields of view.

It should be understood that, unless otherwise explicitly or implicitly indicated herein, any of the features, characteristics, alternatives or modifications described regarding a particular embodiment herein may also be applied, used, or incorporated with any other embodiment described herein, and that the drawings and detailed description of the present disclosure are intended to cover all modifications, equivalents and alternatives to the various embodiments as defined by the appended claims. Moreover, with respect to the one or more methods or processes of the present disclosure described herein, including but not limited to the processes represented in the flow chart of FIG. 3, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain embodiments could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative embodiments thereof, the foregoing and various other additions and omissions may be made therein and thereto without departing from the spirit and scope of the present disclosure.

What is claimed is:

1. An unmanned aerial vehicle comprising:
   a frame, wherein at least one surface of the frame includes at least one marking;
   a first digital camera having a first field of view, wherein the at least one marking is within the first field of view;
   a second digital camera having a second field of view, wherein the at least one marking is within the second field of view, and wherein a second sensor of the second digital camera is located at a baseline distance from a first sensor of the first digital camera;
   a plurality of propulsion motors mounted to the frame, wherein each of the propulsion motors is configured to rotate a propeller about an axis; and
   at least one computer processor,
   wherein the at least one computer processor is configured to at least:
      perform a first calibration of the first digital camera;
      determine at least a first intrinsic parameter and at least a first extrinsic parameter of the first digital camera based at least in part on the first calibration;
      perform a second calibration of the second digital camera;
      determine at least a second intrinsic parameter and at least a second extrinsic parameter of the second digital camera based at least in part on the second calibration;
      determine a first projection of the at least one marking onto a first image plane of the first imaging device based at least in part on the first calibration;
      determine a second projection of the at least one marking onto a second image plane of the second digital camera based at least in part on the second calibration;
      capture a first image by the first digital camera at a first time;
      capture a second image by the second digital camera at approximately the first time,
      recognize at least a portion of the at least one marking depicted in the first image by the at least one computer processor;
      recognize at least the portion of the at least one marking depicted in the second image by the at least one computer processor; and
      determine that a location of the at least one marking within the first image is not consistent with the first projection;
      in response to determining that the location of the at least one marking within the first image is not consistent with the first projection,
         perform a third calibration of the first digital camera based at least in part on the location of the at least one marking within the first image,
      determine that a location of the at least one marking within the second image is not consistent with the second projection; and
      in response to determining that the location of the at least one marking within the second image is not consistent with the second projection,
         perform a fourth calibration of the second digital camera based at least in part on the location of the at least one marking within the second image.

2. The unmanned aerial vehicle of claim 1, wherein the at least one marking comprises at least one of:
   an alphanumeric character;
   a color;
   a line;
   a pattern;
   a shape;
   a symbol;
   a texture; or
   a trademark.

3. The unmanned aerial vehicle of claim 1, wherein the first digital camera and the second digital camera are embedded in one of:
   a forward portion of the frame;
   an aft portion of the frame;
   a port side of the frame;
   a starboard side of the frame; or
   an underside of the frame.

4. A method comprising:
   performing a first calibration of a first digital camera having a first field of view prior to a first time, wherein the first digital camera is provided in association with at least a first surface of a vehicle, and wherein at least one marking provided on a second surface of the vehicle is within the first field of view;

determining a first projection of the at least one marking within a first image plane of the first digital camera based at least in part on the first calibration by at least one computer processor;

performing a second calibration of a second digital camera having a second field of view prior to the first time, wherein the second digital camera is provided in association with at least the first surface of a vehicle, wherein a second sensor of the second digital camera is provided at a baseline distance from a first sensor of the first digital camera and wherein the at least one marking is within the second field of view;

determining a second projection of the at least one marking within a second image plane of the second digital camera based at least in part on the second calibration by the at least one computer processor;

capturing a first image by the first digital camera at the first time;

capturing a second image by the second digital camera at approximately the first time; and at least one of:
  determining that at least a third projection of the at least one marking within the first image is not consistent with the first projection by the at least one computer processor; or
  determining that at least a fourth projection of the at least one marking is in a second location within the second image by the at least one computer processor.

5. The method of claim 4, wherein the vehicle is an aerial vehicle.

6. The method of claim 5, wherein the second surface upon which the at least one marking is provided is at least one of:
  a brake;
  an elevator;
  an elevon;
  an empennage;
  a flap;
  a flaperon;
  a fuselage;
  landing gear;
  a mount;
  a rudder;
  a slat;
  a strut; or
  a wing.

7. The method of claim 5, wherein each of the first calibration and the second calibration is performed with the aerial vehicle grounded prior to the first time, and wherein the aerial vehicle is in flight at the first time.

8. The method of claim 4, wherein the at least one marking comprises at least one of:
  an alphanumeric character;
  a color;
  a line;
  a pattern;
  a shape;
  a symbol;
  a texture; or
  a trademark.

9. The method of claim 4, further comprising:
  capturing a third image by the first digital camera at a second time, wherein the second time is prior to the first time;
  capturing a fourth image by the second digital camera at approximately the second time;
  detecting at least a portion of the at least one marking in a location of the third image corresponding to the first projection by the at least one computer processor;
  detecting at least a portion of the at least one marking in a location of the fourth image corresponding to the second projection by the at least one computer processor;
  defining a first line from a first position of the first sensor through the location of the third image corresponding to the first projection by the at least one computer processor;
  defining a second line from a second position of the second sensor through the location of the fourth image corresponding to the second projection by the at least one computer processor; and
  calculating a first range to the at least one marking based at least in part on an intersection of the first line and the second line by the at least one computer processor.

10. The method of claim 9, wherein determining that at least the third projection of the at least one marking within the first image is not consistent with the first projection comprises:
  detecting at least the portion of the at least one marking in a location of the first image by the at least one computer processor;
  detecting at least the portion of the at least one marking in a location of the second image by the at least one computer processor;
  defining at third line from the first position of the first sensor through the location of the first image by the at least one computer processor;
  defining at fourth line from the second position of the second sensor through the location of the second image by the at least one computer processor;
  calculating a second range to the at least one marking based at least in part on an intersection of the third line and the fourth line by the at least one computer processor; and
  determining that the second range is not the first range.

11. The method of claim 4, further comprising:
  generating a first camera matrix for the first digital camera based at least in part on the first calibration; and
  in response to determining that at least the third projection of the at least one marking within the first image is not consistent with the first projection,
    generating a second camera matrix for the first digital camera based at least in part on a difference between the third projection and the first projection.

12. The method of claim 11, further comprising:
  determining at least one of a first focal length or a first optical center of the first digital camera based at least in part on the first calibration, and
  wherein the method further comprises:
  in response to determining that at least the third projection is not consistent with the first projection,
    determining at least a second focal length or a second optical center of the first digital camera based at least in part on the difference between the third projection and the first projection,
  wherein the second camera matrix is generated based at least in part on the second focal length or the second optical center.

13. The method of claim 11, further comprising:
  determining at least one of a first position, a first yaw angle, a first pitch angle or a first roll angle of the first digital camera based at least in part on the first calibration, and wherein the method further comprises:
in response to determining that at least the third projection is not consistent with the first projection,
determining at least one of a second position, a second yaw angle, a second pitch angle or a second roll angle of the first digital camera based at least in part on the difference between the third projection and the first projection,
wherein the second camera matrix is generated based at least in part on the second position, the second yaw angle, the second pitch angle or the second roll angle.

14. The method of claim 11, further comprising:
generating a depth map based at least in part on the first image, the second image and the second camera matrix.

15. The method of claim 4, wherein the vehicle is an autonomous ground vehicle.

16. A system comprising:
a frame, wherein at least a first surface of the frame includes at least one marking;
a first digital camera provided in association with at least a second surface of the frame, wherein the first digital camera has a first field of view, and wherein the at least one marking is within the first field of view;
a second digital camera provided in association with at least the second surface of the frame, wherein the second digital camera has a second field of view, and wherein the at least one marking is within the second field of view; and
at least one computer processor,
wherein the at least one computer processor is configured to at least:
perform a first calibration of the first digital camera, wherein at least one of a focal length, an optical center, a position, a yaw angle, a pitch angle or a roll angle of the first digital camera is determined based at least in part on the first calibration;
perform a second calibration of the second digital camera, wherein at least one of a focal length, an optical center, a position, a yaw angle, a pitch angle or a roll angle of the second digital camera is determined based at least in part on the second calibration;
determine a first projection of the at least one marking onto a first image plane of the first imaging device based at least in part on the first calibration;
determine a second projection of the at least one marking onto a second image plane of the second digital camera based at least in part on the second calibration;
capture a first image by the first digital camera at a first time;
capture a second image by the second digital camera at approximately the first time,
recognize at least a portion of the at least one marking depicted in the first image by the at least one computer processor;
recognize at least the portion of the at least one marking depicted in the second image by the at least one computer processor; and
determine that a location of the at least one marking within the first image is not consistent with the first projection;
in response to determining that the location of the at least one marking within the first image is not consistent with the first projection,
adjust at least one of the focal length, the optical center, the position, the yaw angle, the pitch angle or the roll angle of the first digital camera.

17. The system of claim 16, wherein the frame is an airframe of an unmanned aerial vehicle.

18. The system of claim 17, wherein the first digital camera and the second digital camera are embedded in one of:
a forward portion of the airframe;
an aft portion of the airframe;
a port side of the airframe;
a starboard side of the airframe; or
an underside of the airframe.

19. The system of claim 17, wherein the second surface upon which the at least one marking is provided is at least one of:
a brake;
an elevator;
an elevon;
an empennage;
a flap;
a flaperon;
a fuselage;
landing gear;
a mount;
a rudder;
a slat;
a strut; or
a wing.

20. The method of claim 16, wherein the at least one marking comprises at least one of:
an alphanumeric character;
a color;
a line;
a pattern;
a shape;
a symbol;
a texture; or
a trademark.

* * * * *